(12) United States Patent
Kurani

(10) Patent No.: US 12,511,626 B2
(45) Date of Patent: *Dec. 30, 2025

(54) SYSTEMS AND METHODS FOR ONLINE MATH BASED CURRENCY (MBC) CARD-BASED EXCHANGES

(71) Applicant: Wells Fargo Bank, N.A., San Francisco, CA (US)

(72) Inventor: Ashish B. Kurani, Burlingame, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,957

(22) Filed: Nov. 14, 2023

(65) Prior Publication Data

US 2024/0086875 A1 Mar. 14, 2024

Related U.S. Application Data

(63) Continuation of application No. 17/526,559, filed on Nov. 15, 2021, now Pat. No. 11,853,979, which is a
(Continued)

(51) Int. Cl.
*G06Q 20/06* (2012.01)
*G06Q 20/24* (2012.01)

(52) U.S. Cl.
CPC ......... *G06Q 20/0655* (2013.01); *G06Q 20/24* (2013.01)

(58) Field of Classification Search
CPC ................. G06Q 20/24; G06Q 20/00–425
(Continued)

(56) References Cited

U.S. PATENT DOCUMENTS

| 5,920,629 | A | 7/1999 | Rosen |
| 6,029,146 | A | 2/2000 | Hawkins et al. |
| 6,047,067 | A | 4/2000 | Rosen |
| 6,721,715 | B2 | 4/2004 | Nemzow |
| 7,103,575 | B1 | 9/2006 | Linehan |

(Continued)

FOREIGN PATENT DOCUMENTS

| CA | 2975528 A1 | 12/2016 |
| CA | 2406418 C | 7/2017 |

(Continued)

OTHER PUBLICATIONS

"Adding Metadata to the Blockchain, part 1," Digiconomist, retrieved from https://digiconomist.net/adding-metadata-blockchain-part-1, 5 pages (2015).

(Continued)

*Primary Examiner* — Chenyuh Kuo
(74) *Attorney, Agent, or Firm* — Foley & Lardner LLP

(57) ABSTRACT

Embodiments include a method of performing math based currency ("MBC") exchanges. One method includes receiving an exchange request, from a customer computer system, a remote exchange request for an amount. The method further includes exchanging, on a published blockchain, an amount of MBC equal to the amount to an MBC account of the online merchant and updating a pooled account database. The method further includes updating an overlay ledger to modify an MBC balance of the MBC account held by the customer and broadcasting the remote exchange to a plurality of MBC verification nodes for verification.

20 Claims, 15 Drawing Sheets

Related U.S. Application Data continuation of application No. 14/323,459, filed on Jul. 3, 2014, now Pat. No. 11,176,524, which is a continuation-in-part of application No. 14/282,200, filed on May 20, 2014, now Pat. No. 11,062,278, and a continuation-in-part of application No. 14/282,189, filed on May 20, 2014, now Pat. No. 10,970,684, and a continuation-in-part of application No. 14/282,202, filed on May 20, 2014, now Pat. No. 10,909,509.

(58) Field of Classification Search
USPC .......................................................... 705/71
See application file for complete search history.

(56) References Cited

U.S. PATENT DOCUMENTS

| | | | |
|---|---|---|---|
| 7,483,860 | B2 | 1/2009 | Cronce et al. |
| 8,086,507 | B1 | 12/2011 | Alder |
| 8,381,969 | B1 | 2/2013 | Miller et al. |
| 8,417,629 | B1 | 4/2013 | Hildebrand et al. |
| 8,639,625 | B1 | 1/2014 | Ginter et al. |
| 9,022,286 | B2 | 5/2015 | Wyatt |
| 9,053,482 | B2 | 6/2015 | Hill et al. |
| RE46,319 | E | 2/2017 | Milman et al. |
| 9,892,460 | B1 | 2/2018 | Winklevoss et al. |
| 10,068,228 | B1 | 9/2018 | Winklevoss et al. |
| 10,096,014 | B2 * | 10/2018 | Mohsenzadeh ...... G06Q 20/223 |
| 10,719,816 | B1 | 7/2020 | Kurani |
| 11,164,164 | B2 | 11/2021 | Minor |
| 11,468,413 | B1 | 10/2022 | Kurani |
| 2002/0138735 | A1 | 9/2002 | Felt et al. |
| 2002/0156718 | A1 | 10/2002 | Olsen et al. |
| 2003/0014496 | A1 | 1/2003 | Spencer et al. |
| 2003/0028481 | A1 | 2/2003 | Flitcroft et al. |
| 2003/0065562 | A1 | 4/2003 | Matsui et al. |
| 2003/0074307 | A1 | 4/2003 | Maestle |
| 2004/0143523 | A1 | 7/2004 | Pegaz-Paquet et al. |
| 2004/0177035 | A1 | 9/2004 | Silva |
| 2005/0152544 | A1 | 7/2005 | Kizawa |
| 2005/0228986 | A1 | 10/2005 | Fukasawa et al. |
| 2006/0282376 | A1 | 12/2006 | Goldberg et al. |
| 2007/0055865 | A1 | 3/2007 | Kakii |
| 2007/0124809 | A1 | 5/2007 | Narin et al. |
| 2007/0130463 | A1 | 6/2007 | Law et al. |
| 2007/0136209 | A1 | 6/2007 | Khan et al. |
| 2007/0168282 | A1 | 7/2007 | Giordano |
| 2007/0177768 | A1 | 8/2007 | Tsantes et al. |
| 2007/0179903 | A1 | 8/2007 | Seinfeld et al. |
| 2007/0219921 | A1 | 9/2007 | Lee et al. |
| 2008/0082439 | A1 | 4/2008 | Everaert et al. |
| 2008/0120248 | A1 | 5/2008 | Roehr |
| 2008/0223918 | A1 | 9/2008 | Williams et al. |
| 2008/0270285 | A1 | 10/2008 | Cartledge et al. |
| 2009/0037913 | A1 | 2/2009 | Dantzig et al. |
| 2009/0119190 | A1 | 5/2009 | Realini |
| 2009/0254440 | A1 | 10/2009 | Pharris |
| 2010/0042539 | A1 | 2/2010 | Dheer et al. |
| 2010/0057607 | A1 | 3/2010 | Galit |
| 2010/0138344 | A1 | 6/2010 | Wong et al. |
| 2010/0138650 | A1 | 6/2010 | Kang et al. |
| 2010/0191605 | A1 | 7/2010 | Nuttall et al. |
| 2011/0047628 | A1 | 2/2011 | Viars |
| 2011/0078087 | A1 | 3/2011 | Brown et al. |
| 2012/0041873 | A1 | 2/2012 | Korosec et al. |
| 2012/0072995 | A1 | 3/2012 | Crawford |
| 2012/0101886 | A1 | 4/2012 | Subramanian et al. |
| 2012/0221470 | A1 | 8/2012 | Lyon |
| 2012/0259716 | A1 | 10/2012 | Rosenberger |
| 2012/0265684 | A1 | 10/2012 | Singh |
| 2013/0104162 | A1 | 4/2013 | Helms et al. |
| 2013/0124306 | A1 | 5/2013 | Hutchinson et al. |
| 2013/0166455 | A1 | 6/2013 | Feigelson |
| 2014/0006273 | A1 | 1/2014 | Gopinath et al. |
| 2014/0032394 | A1 | 1/2014 | Liberty et al. |
| 2014/0136431 | A1 | 5/2014 | Dahod et al. |
| 2014/0143155 | A1 | 5/2014 | Karlov et al. |
| 2014/0244500 | A1 | 8/2014 | Elias |
| 2014/0298040 | A1 | 10/2014 | Ignatchenko et al. |
| 2015/0120569 | A1 | 4/2015 | Belshe et al. |
| 2015/0170112 | A1 * | 6/2015 | DeCastro ............. G06Q 20/367 705/39 |
| 2015/0220892 | A1 | 8/2015 | Allen |
| 2015/0220928 | A1 | 8/2015 | Allen |
| 2015/0262172 | A1 | 9/2015 | Rebernik |
| 2015/0262173 | A1 | 9/2015 | Durbin et al. |
| 2015/0287026 | A1 | 10/2015 | Yang et al. |
| 2015/0310424 | A1 | 10/2015 | Myers |
| 2015/0310476 | A1 | 10/2015 | Gadwa |
| 2015/0324764 | A1 | 11/2015 | Van Rooyen et al. |
| 2015/0332256 | A1 * | 11/2015 | Minor ...................... H04L 9/50 705/69 |
| 2015/0332266 | A1 | 11/2015 | Friedlander et al. |
| 2015/0363770 | A1 * | 12/2015 | Ronca .................. G06Q 20/382 705/64 |
| 2016/0098723 | A1 | 4/2016 | Feeney |
| 2016/0203572 | A1 | 7/2016 | Mcconaghy et al. |
| 2016/0234026 | A1 | 8/2016 | Wilkins et al. |
| 2016/0300234 | A1 | 10/2016 | Moss-Pultz et al. |
| 2016/0323109 | A1 | 11/2016 | Mccoy et al. |
| 2016/0330031 | A1 | 11/2016 | Drego et al. |
| 2016/0350728 | A1 | 12/2016 | Melika et al. |
| 2016/0350749 | A1 | 12/2016 | Wilkins et al. |
| 2017/0061396 | A1 | 3/2017 | Melika et al. |
| 2017/0078255 | A1 | 3/2017 | Nejadian et al. |
| 2017/0109744 | A1 | 4/2017 | Wilkins et al. |
| 2017/0187535 | A1 | 6/2017 | Middleton et al. |
| 2017/0236104 | A1 | 8/2017 | Biton |
| 2021/0326844 | A1 * | 10/2021 | Zhou ..................... G06Q 20/06 |

FOREIGN PATENT DOCUMENTS

| | | | |
|---|---|---|---|
| JP | 2006-059131 | A | 3/2006 |
| WO | WO-03/105396 | A1 | 12/2003 |
| WO | WO-2006/009716 | A2 | 1/2006 |

OTHER PUBLICATIONS

U.S. Appl. No. 14/282,189, filed May 20, 2014.
"Capital adequacy ratios for banks—simplified explanation and example of calculation," Reserve Bank of New Zealand, 9 pages (2007).
"Metadata in the Blockchain: The OP_RETURN Explosion," Coin Sciences Ltd, retrieved from https://www.slideshare.net/coinspark/bitcoin-2-and-opreturns-the-blockchain-as-tcpip, 31 pages (2014).
"What are Coloured Coins and Meta Coins?," CryptoCompare, retrieved from https://www.cryptocompare.com/coins/guides/what-are-coloured-coins-and-meta-coins/, 6 pages (2015).
Bitcoin Directory, Bitcoin Exchange Directory, as available online on Aug. 13, 2011 at http://www.bitcoindir.com/exchange, retrieved from the Internet archives on Oct. 9, 2015, 1 page as printed.
Bower, B. (Aug. 8, 2019). How an ancient stone money system works like cryptocurrency. Retrieved Jul. 27, 2020, from https://www.sciencenews.org/article/yap-stone-money-bitcoin-blockchain-cryptocurrency (Year: 2019).
Crypto Compare: What are Colored Coins and Meta Coins? Feb. 12, 2015, pp. 1-6. (Year: 2015).
Fitzpatrick et al., "Banking on Stone Money: Ancient Antecedents to Bitcoin", Jun. 2019, American Anthropological Association, Economic Anthropology Jun. 2019, p. 1-4, 8-10 (Year: 2019).
Free Software Foundation (The GNU Privacy Handbook, Chapter 3. Key Management, http://web.archive.org/web/20060615000000*/https://www.gnupg.org/gph/en/manual/x457.html, Jun. 18, 2006) (Year: 2006).
Free Software Foundation(The GNU Privacy Handbook, Chapter 3, Key Management. http://web.archive.org/web/20060615000000*/https://www.gnupg.org/gph/en/manual/z457.html, Jun. 18, 2006). 1 page.
Jain, R.: Tokenization: The Future of Payment Security? Jul. 22, 2014, pp. 1-10 (Year: 2014).

(56) References Cited

OTHER PUBLICATIONS

Menezes, A. J., Oorschot, P. C., & Vanstone, S. A. (1997). Handbook of Applied Cryptography. Doi: 10.1201/9780429466335 (Year: 1997).
Mizrahi, "A blockchain-based property ownership recording system," ChromaWay, retrieved from https://chromaway.com/papers/A-blockchain-based-property-registry.pdf, 9 pages (2014).
Nakamoto, "Bitcoin: A Peer-to-Peer Electronic Cash System," Bitcoin, retrieved from https://bitcoin.org/bitcoin.pdf, 9 pages (2008).
Nakamoto, Satoshi: Bitcoin: A peer-to-peer Electronic Cash System, Oct. 31, 2008, pp. 1-6 (Year: 2008).
Pandya, D., Ram K. Thakkar, S., Madhekar. T., & Thakare, B. (2015). Brief History of Encryption, International Journal of Computer Applications, 131 (9), 28-31. Doi: 10.5120/ijca2015907390 (Year: 2015).
Peters et al., Understanding Modern Banking Ledgers through Blockchain Technologies: Future of Transaction Processing and Smart Contracts on the Internet of Money, Nov. 19, 2015, pp. 1-33.
Robert Mcmillan, "The World's First Bitcoin Debit Card is Almost Here", Apr. 24, 2014, Wired (Year: 2014).
Seward, Real money starts to pour into math-based currencies like bitcoin (Year: 2013).
The Free Software Foundation, The GNU Privacy Handbook, Chapter 3, Key Management, http://web.archive.org/web/20060615000000*/https://www.gnupg.org/gph/en/manual/x457.html, Jun. 18, 2006, 1 page.
Webopedia, Public Key Encryption definition, as available on Mar. 18, 2008 at http://www.webopedia.com/TERM/P/public_key_cryptograph.html, retrieved from the Internet archives on Oct. 9, 2015, 3 pages as printed.
"Authentication Mechanisms for Open Distributed Systems", Antonio Nicolosi, Department of Computer Science, Ney York University, Sep. 2007 (Year: 2007).
Evans, Anthony J., "In Defence of 'Demand' Deposits: Contractual Solutions to the Barnett and Block, and Bagus and Howden Debate," 2014, Journal of business ethics, vol. 124 (2), p. 351-364.

* cited by examiner

106

Financial Institution Computing System

128

Overlay Ledger

| Deposit Accounts 302 | | |
|---|---|---|
| Account # | Customer | MBC Balance |
| 123456781 | AAAAAA | 23.5643 |
| 123456782 | AAAAAB | 1.2456 |
| 123456783 | AAAAAC | 100.1762 |
| 123456784 | AAAAAD | 11.2654 |
| 123456785 | AAAAAE | 0.0056 |
| | | |
| | Total: | DDD |

| Credit Accounts 306 | | |
|---|---|---|
| Account # | Customer | MBC Balance |
| 223456781 | BAAAAA | 2.3454 |
| 223456782 | BAAAAB | 12.0364 |
| 223456783 | BAAAAC | 13.2765 |
| 223456784 | BAAAAD | 53.0043 |
| 223456785 | BAAAAE | 0.9821 |
| | | |
| | Total: | CCC |

126

Pooled Account: Key Storage

| Private Key | Public Key | Hash | Amount |
|---|---|---|---|
| PrKp234561 | PuKp234561 | Hash234561 | 23.2445 |
| PrKp234562 | PuKp234562 | Hash234562 | 1.5606 |
| PrKp234563 | PuKp234563 | Hash234563 | 67.2345 |
| PrKp234564 | PrKp234564 | Hash234564 | 5.0934 |
| PrKp234565 | PrKp234565 | Hash234565 | 4.2341 |
| | | | |
| | | Total: | XXX |
| | | | |
| | where XXX << CCC; XXX << DDD | | |

FIG. 3

SYSTEMS AND METHODS FOR ONLINE MATH BASED CURRENCY (MBC) CARD-BASED EXCHANGES

CROSS-REFERENCE TO RELATED APPLICATIONS AND CLAIM OF PRIORITY

This application is a continuation of U.S. patent application Ser. No. 17/526,559, titled "Math Based Currency Credit Card," filed Nov. 15, 2021, which is a continuation of and claims priority to U.S. patent application Ser. No. 14/323,459 (now U.S. Pat. No. 11,176,524), titled "Math Based Currency Credit Card," filed Jul. 3, 2014, which is (1) a continuation-in-part of U.S. patent application Ser. No. 14/282,189 (now U.S. Pat. No. 10,970,684), titled "Systems and Methods for Maintaining Deposits of Math-Based Currency," filed May 20, 2014, (2) also a continuation-in-part of U.S. patent application Ser. No. 14/282,200 (now U.S. Pat. No. 11,062,278), titled "Systems and Methods for Math-Based Currency Transactions," filed May 20, 2014, and (3) also a continuation-in-part of U.S. patent application Ser. No. 14/282,202 (now U.S. Pat. No. 10,909,509), titled "Infrastructure for Maintaining Math-Based Currency Accounts," filed May 20, 2014. All of which are incorporated herein by reference in their entireties and for all purposes.

BACKGROUND

Math-based currency ("MBC"), commonly referred to as cryptocurrency, is rising in popularity, use, and public acceptance. MBC differs from fiat currency (i.e., currency that is declared by a government to be a legal tender) in that principles of cryptography are used to create, secure, and transfer MBC directly from a first user to a second user. A user of MBC can transfer funds to another party by using a private key associated with a certain value of MBC. The private key may be used to generate a signature for the transaction, and the signature can be verified by nodes in the MBC network, thereby completing the transaction. Additional information, including the identities of the parties involved in the exchange, is not required to effectuate the transaction. Accordingly, MBC allows for anonymous transfers of currency between users without the reliance on financial institutions (e.g., a bank) to facilitate the transfer. Examples of MBCs include Bitcoin, Ripple, Litecoin, Peercoin, and Dogecoin, among others.

Generally, users of MBC store information relating to private key and public key pairs that are associated with specific values of MBC in MBC wallet applications. The wallet applications are used to facilitate the above described transfers. The wallet applications are provided by services that provide a secure place for users to store private keys associated with MBC. Beyond that, however the wallet applications do not take actual possession of or an ownership interest in the MBC.

SUMMARY

An example embodiment includes a method of performing a math based currency ("MBC") transaction. The method includes receiving, from a recipient computer system, information regarding an MBC backed credit card account, information regarding a recipient account and an amount of funds to be transferred to the recipient account from the MBC backed credit card account. The method further includes verifying, by the financial institution computer system, that the amount of funds that are available in the MBC backed credit card account. In various embodiments the method includes updating, by the financial institution computer system, an overlay ledger to increase the balance owed by a customer that holds the MBC backed credit card account.

Another example embodiment includes a method for performing a transaction that sends, by a financial institution computing system, a MBC backed credit card to a customer to share the information on the MBC backed credit card with a recipient computer system, the credit card being readable by a point of sale device to make a payment for a service or a good. The transaction includes receiving, from the recipient computer system, the information on the MBC backed credit card, a recipient identification information with a MBC account of the recipient, and an amount of MBC to be transmitted to the MBC account of the recipient. In some embodiments, responsive to determining that the recipient is registered with the financial institution computing system, updating an overlay ledger that lists a MBC balance of the MBC account of the recipient and an ledger that lists the MBC balance of the MBC backed credit card held by the customer.

Another embodiment includes a system for performing a credit transaction, the system includes a financial institution computer system configured to receive information regarding an MBC backed credit card account from a recipient computer system as provided by a customer that has a credit card account with a financial institution. The financial institution computer system may be configured to receive, an MBC account of the recipient, and an amount of MBC to be transmitted to the recipient. In various embodiments, the financial institution computer system is configured to update a ledger that lists a MBC balance of the MBC account of the recipient, upon determining that the MBC account of the recipient is held by the financial institution computer system that also holds the MBC backed credit card account held by the customer. The some embodiments, the financial institution computer system is configured to update an overlay ledger that lists a MBC balance of the MBC account of the recipient and the ledger that lists the MBC balance of the customer.

According to an example embodiment, a method of performing a math based currency ("MBC") transaction, the method may include sending a token to a customer computing device to share the token with a recipient computer system in exchange for payment for a service or a good. The method includes receiving, from the recipient computer system, the token, a recipient public key associated with a MBC account of the recipient, and an amount of MBC to be transmitted to the recipient. The method may include transmitting, to MBC processing nodes, a request to transfer the amount of MBC in a pooled MBC account of a financial institution to the MBC account of the recipient.

According to another example embodiment a method of transferring MBC funds may include sending, by a financial institution computing system, a token to a customer computing device to share the token with a recipient computer system in exchange for payment for a service or a good. The method may further include receiving, from the recipient computer system, the token, a recipient public key associated with a MBC account of the recipient, and an amount of MBC to be transmitted to the recipient. In the method responsive to determining that the recipient public key is registered with the financial institution computing system, updating a ledger that lists a MBC balance of the MBC account of the recipient and the ledger that lists the MBC balance of the customer.

According to another example embodiment a mobile wallet bank computer system may send a token to a customer computing device to share the token with a recipient computer system in exchange for payment for a service or a good. The mobile wallet bank computer system may receive, the token, a recipient public key associated with a MBC account of the recipient, and a transaction amount. The mobile wallet bank computer system determines whether the recipient public key is registered with the mobile wallet bank computer system. The mobile wallet bank computer system updates a ledger that lists a MBC balance of the MBC account of the recipient and the ledger that lists the MBC balance of the customer or transmits, to MBC processing nodes, a request to transfer the amount of MBC in a pooled MBC account of a financial institution to the MBC account of the recipient.

BRIEF DESCRIPTION OF THE FIGURES

FIG. 3 is a detailed representation of an overlay ledger and a pooled account within the financial institution computing system is shown according to an example embodiment.

DETAILED DESCRIPTION

Referring generally to the figures, banking systems and methods for a mobile wallet system implemented using math-based currency ("MBC") are shown. The banking systems and methods allow holders of MBC units to utilize advantageous banking services, such as deposit services, interest accrual, credit services, withdrawal services, insurance services, and the like in the context of a mobile wallet platform. Additionally, the banking systems and methods allow financial institutions to take possession of MBC such that the financial institutions can insure deposits (i.e., up to FDIC limits) and lend against MBC deposits.

Figure 1:
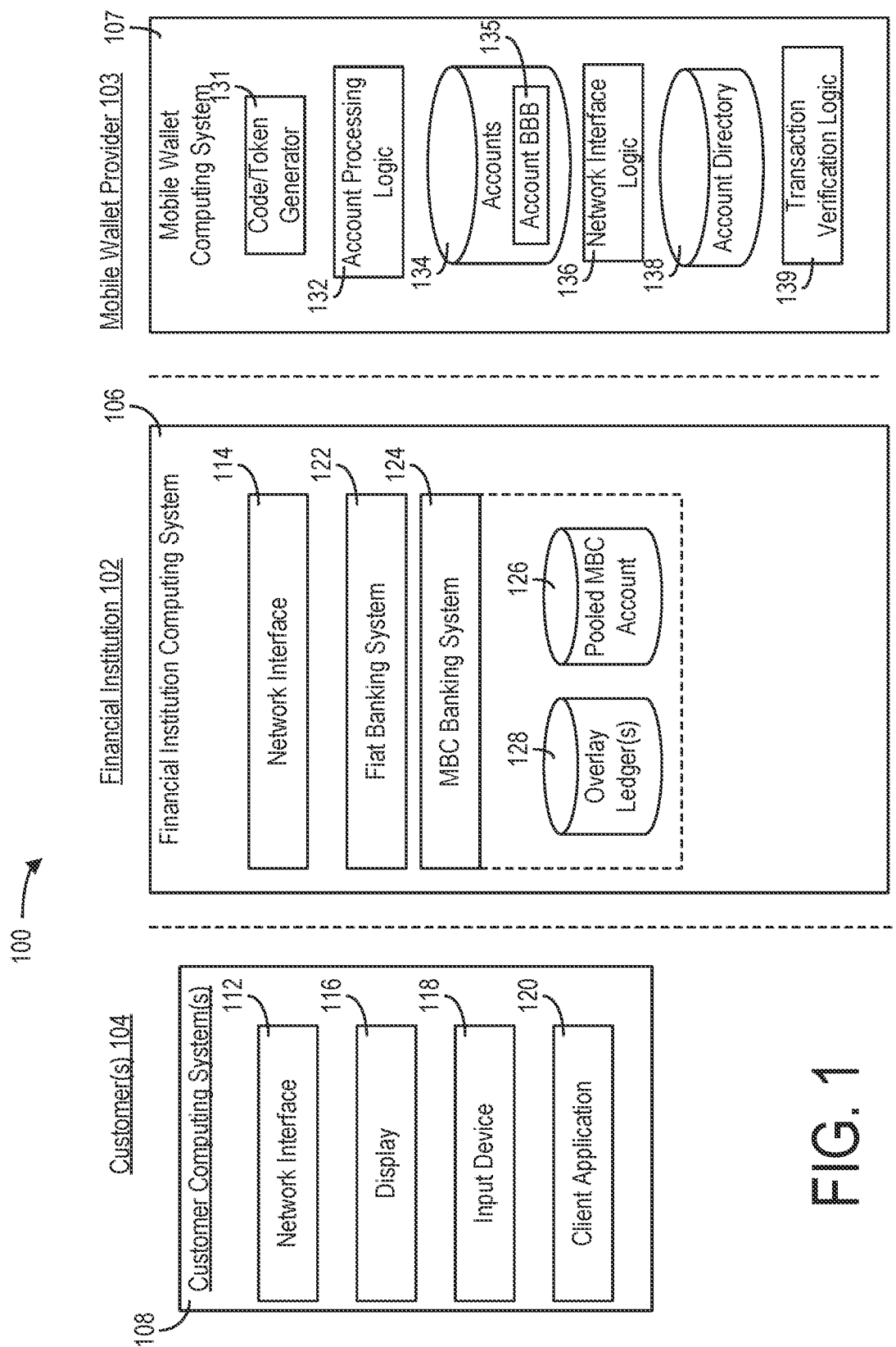
FIG. 1 is a schematic diagram of a banking system for math-based currency ("MBC") according to an example embodiment.

Referring to FIG. 1, a schematic diagram of a banking system 100 for MBC is shown according to an example embodiment. System 100 includes a customer financial institution 102, a mobile wallet provider 103, and a plurality of banking customers 104. Generally, customers 104 interface with the customer financial institution 102 and the mobile wallet provider 103 by communicating with the financial institution computing system 106 and the mobile wallet computer system 107 via customer computing systems 108. In some embodiments, the financial institution 102 and the mobile wallet provider 103 are the same entity, and the financial institution computing system 106 and the mobile wallet computer system 107 are implemented by the same computer system. In other embodiments, the financial institution 102 and the mobile wallet provider 103 are different entities, and the financial institution computing system 106 and the mobile wallet computer system 107 are implemented by different computer systems. In such embodiments, the mobile wallet provider 103 may or may not itself be another financial institution. In various embodiments, the customer may use a mobile wallet with MBC accounts held at the financial institution 102, the mobile wallet provider 103 (e.g., if the mobile wallet provider 103 is also a financial institution), and/or at other financial institutions.

The customer computing systems 108 may include smartphones, tablet computing systems, laptop computing systems, desktop computing systems, PDAs, and the like. The financial institution computing system 106 may, for example, include one or more servers each with one or more processors configured to execute instructions stored in a memory, send and receive data stored in the memory, and perform other operations to implement the financial services described herein associated with the processing modules, databases, and processes shown in FIGS. 1-14. Computing systems 106-108 communicate over a network which may include one or more of the Internet, cellular networks, proprietary banking networks, and the like. Customer computing systems 108 each include a network interface 112 to facilitate data transmission over the network. Likewise, the computing systems 106 and 107 include a network interface to facilitate data transmission over the network.

Customer computing systems 108 each include a display 116, an input device 118, and a client application 120. The display 116 may be used to present account information, transaction information, and the like to customers 104. The input device 118 may be used to provide input to the customer computing systems 108 and to the financial institution computing system 106 through the network. The input may relate to deposit requests, withdrawal requests, credit requests, personal information, and other information used to facilitate transactions between the financial institution 102 and the customers 104. The input device 118 may include a keyboard, a mouse, a touchscreen, a biometric sensor (e.g., a fingerprint sensor), a microphone, a camera, and so on. The client application 120 may comprise program logic (i.e., stored executable instructions) configured to implement at least some of the functions described herein. The client application 120 may simply be a web browser (e.g., Internet Explorer®, Chrome®, Safari®, etc.) configured to receive and display web pages received from the financial institution computing system 106. In other arrangements, the client application 120 may include a dedicated application (e.g., a smartphone application), a text message interface, or another program suitable for communicating with the financial institution computing system 106 over the network.

Financial institution 102 offers banking services to customers 104. Financial institution 102 offers traditional fiat currency banking services through a fiat banking system 122 within the financial institution computing system 106. Fiat currency is money that is declared by a government to be legal tender (e.g., US Dollars, Canadian Dollars, Chinese Yuan, Euros, Japanese Yen, etc.). The fiat banking services may include demand deposit accounts, credit services, loan services, investment services, and the like. As described in further detail below, financial institution 102 also offers MBC services through a MBC banking system 124 within the financial institution computing system 106.

In some arrangements, customers 104 are account holders with the financial institution 102. Customers 104 may use financial institution 102 for fiat banking services. For example, a customer 104 may have a fiat currency deposit account, such as a savings account or a checking account in US Dollars. Additionally or alternatively, customers 104 may have MBC accounts with the financial institution 102. In other arrangements, customers 104 are not account holders with the financial institution 102. In such arrangements, the customers 104 may be required to become account holders with the financial institution 102 prior to engaging in financial transactions with the financial institution 102. In order to become an account holder, the customer 104 may provide personal information (e.g., name, address, date of birth, social security number, tax identifications, etc.) to the financial institution 102 and submit to any necessary background checks.

As briefly mentioned above and as described in further detail with respect to FIGS. 2-14, the financial institution 102 provides MBC banking services to customers 104. In an example embodiment, MBC is electronically transferred from customers 104 to the financial institution 102 and the MBC is properly secured within the financial institution in order to avoid double spending of the MBC by the customer. In one example embodiment, the customer transfers various information for the MBC (including the private keys) and the financial institution 102 executes an internal transfer of the MBC to a new private key/public key pair which are then stored in a database. In another example embodiment, the customers 204 initiate a transaction to the financial institution 102 and the new private/public key pair which are created as a result of the performance of the transaction are stored in the database. The financial institution 102 includes a pooled MBC account 126 (i.e., a database of private key/public key pairs). The MBC stored in the pooled MBC account may be significantly less than the total amount of MBC received in the form of deposits and may not be associated with any particular customer. The financial institution computing system further includes at least one overlay ledger 128 that tracks the amount of MBC that is associated with each of the customers 104. Thus, the financial institution 102 does not need to separate each of the customers' 104 MBC into separate addresses or maintain a complete balance of MBC in the pooled MBC account 126.

The pooled MBC account 126 is used by the financial instruction 102 to take possession of MBC deposited by customers 104. The pooled MBC account 126 is a database of addresses, private keys, and public keys associated with MBC that has been transferred to the financial institution 102. The financial institution 102 maintains the contents of the pooled MBC account 126 in secrecy such that entities and people outside of the financial institution 102 do not have knowledge of the addresses, private keys, and public keys associated with the MBC transferred to the financial institution 102. Through the pooled MBC account 126, the financial institution 102 maintains the MBC from customers 104 received during deposit transactions and initiates transfers of MBC to customers 104 during withdrawal transactions. In some arrangements, the financial institution 102 may maintain a plurality of pooled MBC accounts (i.e., a plurality of separate databases) containing MBC of a plurality of customers. The plurality of pooled MBC accounts may be limited to pooling up to a certain number of customers 104 MBC, a certain amount of MBC, and/or may be divided by types of accounts (e.g., credit account, savings account, checking account, etc.). In further arrangements, the financial institution 102 maintains individual MBC accounts for each customer 104.

The overlay ledger 128 provides a record of association for the MBC within the pooled MBC account 126. The overlay ledger 128 associates an individual customer 104 with a designated amount of MBC transferred to the financial institution 102. The overlay ledger 128 may be stored in a database. Each account for customers 104 may be associated with a single entry in the database. The same or additional ledgering systems may be used to track transactions (e.g., credit and debit transactions) for each the specific MBC accounts. The financial institution 102 updates the overlay ledger 128 after each MBC transfer into and out of the pooled MBC account 126. In certain situations, the financial institution 102 may update the overlay ledger 128 without a transfer of MBC into or out of the pooled MBC account 126. For example, if a first customer wants to transfer a designated amount of MBC to a second customer, and both customers are account holders with the financial institution 102, the transfer may be effectuated by updating the overlay ledger 128 without an actual transfer of MBC in the pooled MBC account 126. Further details of how the financial institution 102 uses the overlay ledger 128 to maintain records of account balances and transactions are described below with respect to FIGS. 2-10.

The mobile wallet computer system 107 includes code/token generator 131, account processing logic 132, an accounts database 134, network interface logic 136, transaction verification logic 139, and an account directory 138. The mobile wallet accounts may be created via interaction of the client application 120 with the mobile wallet computer system 107. The flow of funds into and out of the mobile wallet accounts may also be processed by the mobile wallet computer system 107. In other embodiments, the mobile wallet computer system 107 may send transaction data to fiat banking system 122, the MBC banking system 124, pooled MBC account 126 and overlay ledger(s) 128.

The mobile wallet computer system 107 is configured to store information regarding mobile wallet accounts. By way of example, information for a specific mobile wallet account 135 is shown as being stored in the accounts database 134. As will be appreciated, the accounts database 134 may also store information regarding many other mobile wallet accounts (not shown). As will also be appreciated, the extent to which transaction details are tracked and maintained in account processing logic 132 and stored in a storage database provided by the mobile wallet computer system 107 may vary in differing embodiments. The account database

134 may store details regarding accounts, such as but not limited to, mobile wallet accounts. In particular, the account database 134 may store each financial transaction that occurred. Each financial transaction may include the amount of the transaction and an identification of the recipient.

The code generator 131 may receive a request from the customer computing system 108 to initiate a transaction. In response, the code generator 131 may generate a token that may be transmitted by the customer computing system 108 to the recipient 140 or the recipient website computer system 142. As will be appreciated, any suitable method may be used to transmit the token. In various embodiments, the token may be transmitted using optical image methods (e.g., QR code), NFC, wireless, Bluetooth, low energy Bluetooth, RFID, hypersonic, Wi-Fi, cellular 3G, 4G, GSM, LiFi, etc. In other embodiments, the token may be physically typed in to a website provided by a merchant or business. In various embodiments, the token may be generated without the account holder providing the identity of the recipient or the amount of transaction.

In some embodiments, the code/token generator 131 generates a code that is uniquely associated with the transaction. In other embodiments, a reuseable code is generated. In some embodiments, the code can include information such as a date, time, trace ID, unique transaction identifier, customer identification information, MBC account number, geographic location of the customer computing system 108, and/or other information. In some embodiments, the token may incorporate at least a portion of an account number for a source account or the public key of the source account that is associated with the mobile wallet account. The incorporated user account information may indicate the payment method to be associated with the transaction (e.g., which of the user's MBC accounts or ledgers will be used as the source of the funds for the transaction). In various embodiments, the token may be generated such that a combination of random digits and a portion of a payment card number are included in the token. In some embodiments, the token generator 131 may generate a tokenized numerical code that is in the Track 1 and Track 2 formats as specified by the ISO 7811 specification.

The mobile wallet account 135 holds funds that are transmitted to a recipient upon receiving instructions from the user through the customer computing system 108. As described below, funds flow into and out of the pooled MBC account 126 or the other MBC accounts. The network interface logic 136 may include, for example, program logic that connects the mobile wallet computer system 107 to the financial institution computing system 106, the customer computing system 104, the MBC nodes 218 (discussed below), other financial institutions (e.g., the financial institutions of funds recipients/senders), and so on.

The mobile wallet computer system 107 further includes transaction verification logic 139. The transaction verification logic 139 may receive a transaction amount from the recipients 140 or 142. In some embodiments, the transaction verification logic 139 may generate a message to send to the customer computing system 108 for verifying the transaction amount. Upon receiving the verification message, the customer via the customer computing system 108 may approve or deny the transaction amount for the mobile wallet computer system 107.

In an example embodiment, during the registration process for the mobile wallet account 135, the user may be prompted to identify a source account, that is, a source of funds or MBC account for the mobile wallet account. The source account may be an existing MBC account such as a demand deposit account, a credit card account, or other account. As previously indicated, the account may be held by the customer at the financial institution 102, at the mobile wallet provider 103 (e.g., if the mobile wallet provider 103 is also a financial institution), or with another entity.

Figure 2:
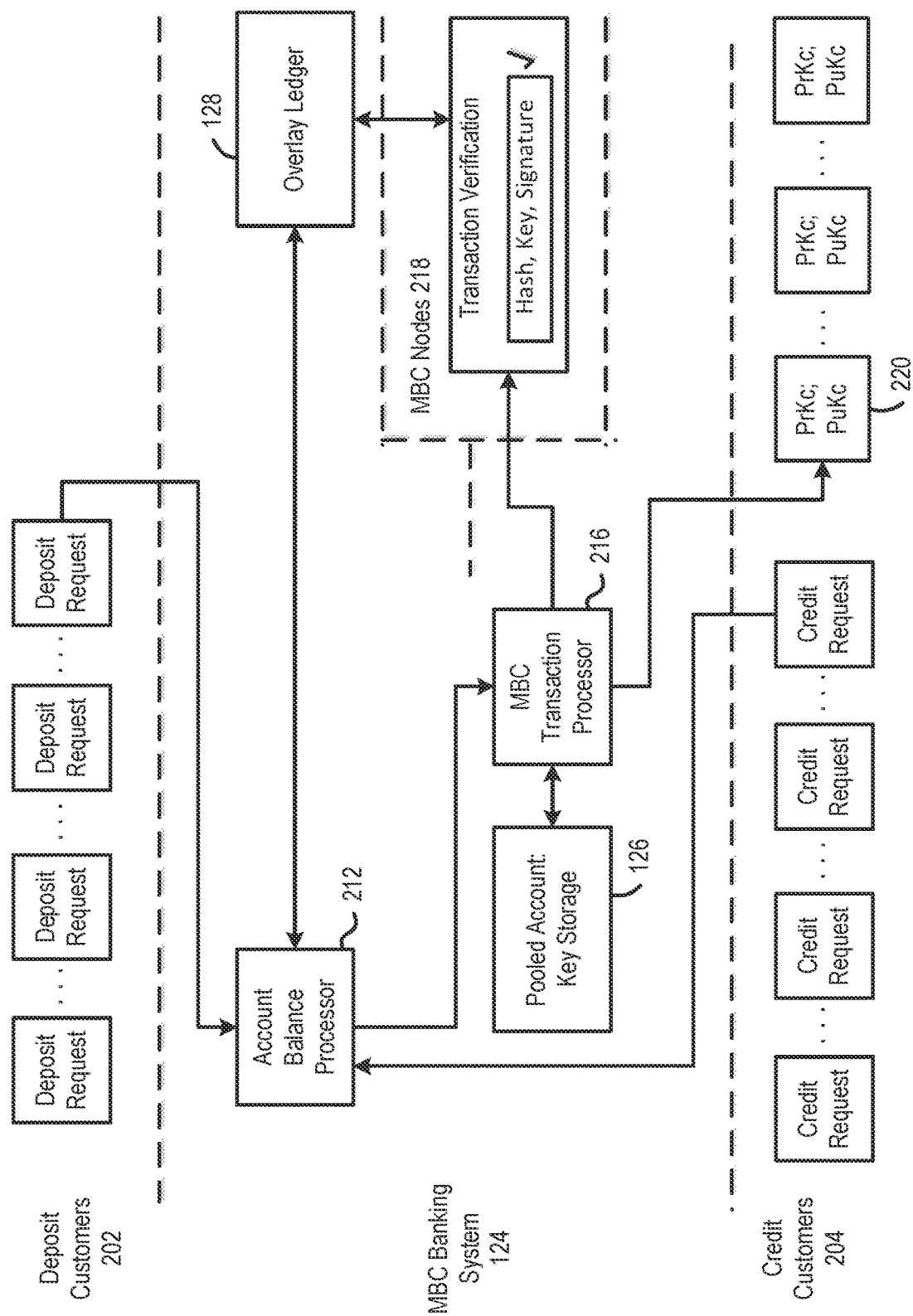
FIG. 2 is a flow diagram of interactions between customers and a MBC banking system according to an example embodiment.

Referring now to FIGS. 2-10, FIGS. 2-10 provide an overview of an MBC banking system. Referring first to FIG. 2, a flow diagram of interactions between deposit customers 202, credit customers 204, and a MBC banking system 124 (e.g., financial institution 102) is shown according to an example embodiment. Deposit customers 202 and credit customers 204 are account holders with the MBC banking 124. In other arrangements, and as described in further detail below, deposit customers 202 and credit customers 204 may be registered to become account holders with the MBC banking system 124 prior to engaging in transactions with the MBC banking system 124. As shown in FIG. 2, a flow of deposit requests 208 is received by the MBC banking system 124 from customers 202 and a flow of credit requests is received by the MBC banking system from customers 204. The deposits received from customers 202 are used to fund the credit given to customers 204. As will be appreciated, the customers 202 and 204 may be overlapping (i.e., a customer that makes a deposit in one situation may receive credit in another situation).

All customer requests (i.e., deposit requests 208 and credit requests 210) are received at an account balance processor 212 of the MBC banking system 124. The account balance processor 212 may communicate directly with client devices (e.g., customer computing systems 108) via a network (e.g., network 110). The account balance processor 212 receives requests (e.g., deposit requests 208 and credit requests 210), MBC information (e.g., public key information, private key information, hash value, signature information, etc.), deposit information (e.g., amount of MBC to be deposited), account information, and the like from deposit customers 202 and credit customers 204. Based on the received information, the account balance processor 212 updates data in the overlay ledger 128. The contents of the overlay ledger 128 are described in further detail below with respect to FIG. 3. The account balance processor 212 communicates the other received information with a MBC transaction processor 216.

The MBC transaction processor 216 processes transactions between the customers and the MBC banking system 124. As discussed above, in an example embodiment, the MBC banking system 124 secures the deposited MBC by transferring the MBC to a private key/public key pair owned by the MBC banking system 124. The MBC transaction processor 216 initiates these transactions. The transaction may take the form of a direct transaction from the customer to a private key/public key pair having information stored in the pooled account database 126 of the MBC banking system 124. In another embodiment, the transaction may involve a transfer of the private key/public key pair into the pooled account 126. In either case, the final information relating to the deposited MBC (e.g., the private key, the public key, the hash value, MBC balances, and any associated signatures or hashes) is stored in pooled account 126. As explained in further detail below with respect to FIG. 3, the pooled account 126 includes a database that stores the above noted information.

The MBC transaction processor 216 communicates MBC transaction information to MBC nodes 218. The MBC nodes 218 verify MBC transactions. The MBC nodes 218 may verify transactions involving the MBC bank 206 in addition to MBC transactions not involving the MBC bank 206. The MBC nodes 218 verify MBC transactions by verifying information relating to the transaction, such as by verifying the signatures of the MBC transactions and by verifying that there has not been double-spending of the MBC involved in the transaction. The information in the overlay ledger 128 may be updated to indicate that the transaction has been verified.

Still referring to FIG. 2, the MBC transaction processor 216 also communicates with credit customers 204. The MBC transaction processor 216 may communicate with credit customers 204 via computing devices of the credit customers 204 (e.g., via customer computing system 108). During a transfer of MBC from the MBC banking system 124 to credit customers 204, the MBC banking system 124 provides various information relating to the MBC 220, such as a private key for credit transactions ("PrKc"), a public key for credit transactions ("PuKc"), an amount of the MBC, and so on to the credit customers 204.

Referring now to FIG. 3, a detailed representation of the overlay ledger 128 and the pooled account 126 within the financial institution computing system 106 is shown. The overlay ledger 128 is a database that associates designated amounts of MBC with bank account numbers and customer identifications. The overlay ledger 128 may be split into multiple ledgers. For example, as shown in FIG. 3, the overlay ledger includes a listing of deposit accounts 302 and a listing of credit accounts 304. As will be appreciated, the overlay ledger may further be organized according to various types of accounts and subaccounts. Each listing 302 and 304 includes a plurality of entries 306, each relating to a specific account within the financial institution 102. Each listing 306 includes an account number, a customer associated with the account number, and a balance of MBC. The customer may be identified by name, another identification (e.g., tax payer identification, social security number, etc.), or a combination thereof. The balance of MBC may express a positive number of MBC associated with the account (e.g., the number of MBC deposited by the customer) or an amount of MBC owed to the bank (e.g., as done in the listing of credit accounts 304). The account holders may have access to the balance information included in the overlay ledger 128 (e.g., via a website associated with the financial institution 102, a financial institution application running on a smartphone or tablet, in-person at a branch location of the financial institution, and/or through an ATM associated with the financial institution). Although the overlay ledger 128 associates amounts of MBC with individual accounts, the overlay ledger 128 does not associate specific private keys, public keys, and hashes with specific customer accounts. The amount of MBC listed in the overly ledger 128 is decoupled from the total amount of deposits and the total amount of credits within the financial institution 102. As indicated in FIG. 3, the amount of MBC listed in the overlay ledger 128 may be much less than the total amount of MBC on deposit at the financial institution. For example, the amount of MBC listed in the overlay ledger 128 may less than 15% of the total amount of MBC on deposit at the financial institution, less than 10% of the total amount of MBC on deposit at the financial institution, less than 5% of the total amount of MBC on deposit at the financial institution, or another percentage thereof.

The pooled account 126 comprises a database that stores the private keys, public keys, hash values, and amounts of MBC associated with each private key/public key/hash value group. The contents of the pooled account 126 remain secure and are not shared with individuals and entities outside of the financial institution 102. When the financial institution 102 receives MBC from a customer in a transaction, the information relating to the received MBC (i.e., the private key, the public key, the hash value, and an indication of the amount of MBC) is stored in the pooled account. When the financial institution 102 provides MBC to a customer in a transaction, the MBC is ultimately transferred based on the MBC information stored in the pooled account 126. After the transfer is complete, the overlay ledger 128 is updated to reflect the appropriate changes in account balances.

Information contained in the overlay ledger 128 and the pooled account 126 is routinely reconciled by the financial institution 102. The reconciliation of the information contained in the overlay ledger 128 and the pooled account 126 (as well as other assets of the financial institution 102) that the information contained within the overlay ledger 128 is up-to-date and accurate. The information is reconciled to ensure that the balance of assets (e.g., MBC) on hand is accurate, the balance of loans outstanding is accurate, and the amount associated with individual accounts is accurate. The reconciliation processes may be carried out by the account balance processor 212 or by individuals. The reconciliation process may be performed on a repeating basis (e.g., on a daily basis, on an hourly basis, etc.). The MBC reconciliation process may be performed in conjunction with any reconciliation of other assets of the financial institution 102.

Figure 4:
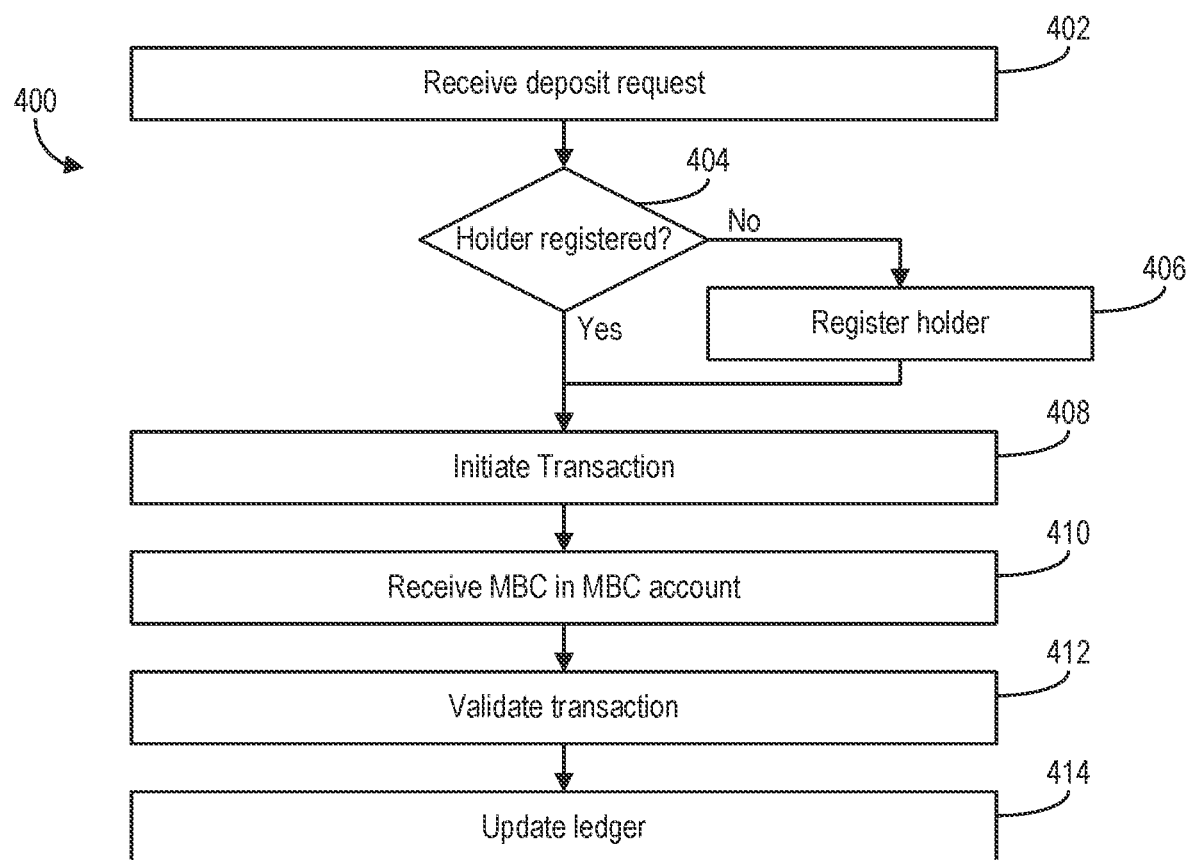
FIG. 4 is a flow diagram of a method of receiving MBC from a holder for deposit at a financial institution is shown according to an example embodiment.
Figure 5:
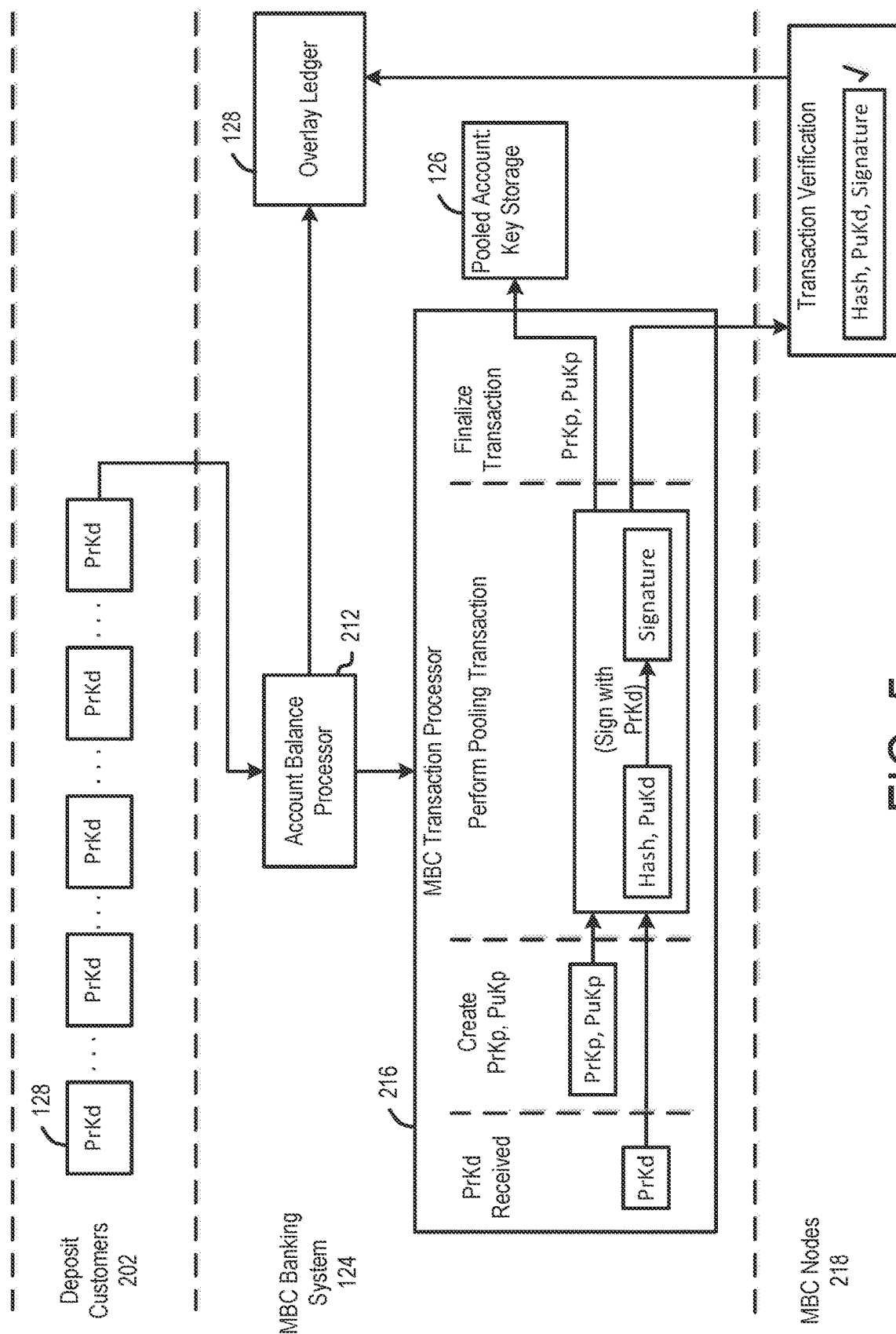
FIG. 5 is a flow diagram of how the deposit transaction of FIG. 4 is carried out by a financial institution according to an example embodiment.

Referring now to FIGS. 4 and 5, FIG. 4 shows a method 400 of receiving MBC from an account holder for deposit at a financial institution according to an example embodiment. FIG. 5 shows the interaction of structural components of FIG. 1 in accordance with the process steps of FIG. 4. In the example of FIG. 5, the customer makes a deposit by transferring various information for the MBC (including the private keys) to the financial institution 102. The financial institution 102 then executes an internal transfer of the MBC to a new private key/public key pair which are then stored in a database. As indicated above, other mechanisms may also be employed for receiving deposits.

Method 400 begins when a request to deposit MBC is received (402). The request (e.g., deposit request 208) is sent by a holder (e.g., deposit customer 202) of MBC to the financial institution. The request may include information relating to any of an identity of the holder, a type of the MBC to be deposited, an amount of the MBC, a public key associated with the MBC, a private key associated with the MBC (e.g., PrKd 502), and a desired destination for the MBC (e.g., an account within the financial institution associated with the holder within the financial institution). In some arrangements, the request is transmitted from a user device (e.g., a personal computer, a smartphone, customer computing system 108, etc.) and received by the account balance processor 212 of the MBC banking system 124 of the financial institution 106. In other arrangements, the request is initiated by an employee of the financial institution entering data into a computing system (e.g., an employee terminal connected to the server of the financial institution) during a person-to-person interaction. For example, the holder may walk into a branch location of the financial institution and initiate the deposit request via interaction with a teller at the branch.

After receiving the request, the financial institution determines if the requesting holder is registered with the financial institution (404). Generally, the holder is registered if the holder already has an MBC account with the financial institution. If the holder is not registered, the financial institution registers the holder (406). To register the holder, the financial institution requests information from the holder in order to open a MBC deposit account. The information may include information relating to the holder, such as name, date of birth, social security number, tax identification numbers, credit information, biometric information, and the like. The financial institution 102 knows the identities of its customers 104. The identity information may not be shared with the external MBC system (e.g., the MBC nodes 218 are unaware of the identities of the customers 104). After the holder provides the required information, the financial institution creates the necessary MBC accounts to continue with the deposit transaction.

If the holder is already registered or after the holder has been registered, the financial institution initiates a transaction of the MBC to be deposited from the holder to the financial institution (408). The transaction may be performed by a MBC transaction processor 216 within the MBC banking system 124. The MBC transaction processor 216 receives the private key PrKd for the deposit from the account balance processor. The MBC transaction processor 216 creates a new private key ("PrKp") and public key ("PuKp") for the transaction. The PrKp and PuKp will ultimately be stored in the pooled account 126. The private key PrKd provided from the customer is used by the MBC transaction processor 216 to sign a transaction request from the holder to the private key/public key pair PrKp/PuKp created by the MBC transaction processor 216. This creates a signature of the transaction, which is later used to verify the transaction. During the transaction, the account balance processor 212 may preliminarily update the overlay ledger 128 to indicate that the holder has deposited the designated amount of MBC into the associated account. The overlay ledger 128 may include an indication that the deposit transaction has not yet been verified. The indication may include information necessary to identify the unverified transaction in a later verification notification received from MBC nodes 218 (as described in further detail below with respect to 412 and 414).

In an alternative arrangement, instead of receiving a private key/public key pair as shown in FIG. 5, the deposit customer 202 initiates a transaction to an address (e.g., public key) associated with the financial institution. In this situation, the deposit customer 202 sends a request for an address to the financial institution (e.g., via the account balance processor 212). The MBC transaction processor 216 creates a new private key/public key pair and provides the public key to the deposit customer 202. The deposit customer 202 uses a MBC client (e.g., a MBC wallet application running on customer computing system 108) to initiate the transfer of MBC to the financial institution 102. After the transaction, the financial institution 102 stores the private key and public key pair in the pooled account 126.

After the transaction has been performed, the information relating to the transaction is stored in a pooled account (410). The MBC transaction processor 216 stores the PrKp, PuKp, hash value, and associated MBC balance in the pooled account 126. As discussed above, the pooled account 126 includes a database that stores the private keys, public keys, hash values, and amounts of MBC associated with each private key/public key/hash value group. The financial institution maintains the public keys, private keys, hash values, and amount of associated MBC of the pooled account 126 in secrecy to protect the deposited MBC from unauthorized transfers.

To validate the transaction (412), the MBC transaction processor 216 communicates MBC transaction information to MBC nodes 218, which use the transaction information to verify MBC transactions. The transactions are verified by operation of the MBC nodes 218. The MBC nodes 218 may verify the MBC transactions by verifying information relating to the transaction, such as determining that the signatures appear to be valid based on the public key and the hash used in the transaction. The verification information may be published in a chain of transactions (i.e., a blockchain) that is later used for further verifications. The MBC transaction processor 216 may determine the verification status of the individual transactions by accessing the chain of transactions from the MBC nodes 218. The verification information may be used to reconcile information contained in the overlay ledger 128 (e.g., during the above described reconciliation processes).

After the transaction is verified, the overlay ledger 128 is updated to reflect the deposited MBC (414). The overlay ledger 128 keeps track of the amount of MBC associated with each account holder with the financial institution. The overlay ledger 128 may be updated by the account balance processor 212 in response to receiving an indication from the MBC transaction processor 216 that the transaction has been verified by the MBC nodes 218. As previously indicated, there is no specific (one-to-one) correlation between the MBC held in the pooled account 126 and the MBC deposited by individual customers. Instead, the MBC received in the form of MBC deposits is pooled and the vast majority of the MBC is redeployed for other purposes, e.g., to make loans of MBC to other customers. As a result, the amount of MBC listed in the overlay ledger 128 may be much less than the total amount of MBC on deposit at the financial institution. After verification, the amount of deposited MBC may become available for use by the deposit customer 202 (i.e., the deposit customer 202 may perform a further transaction with the deposited MBC such as paying down a credit balance or withdrawing the deposited MBC).

Figure 6:
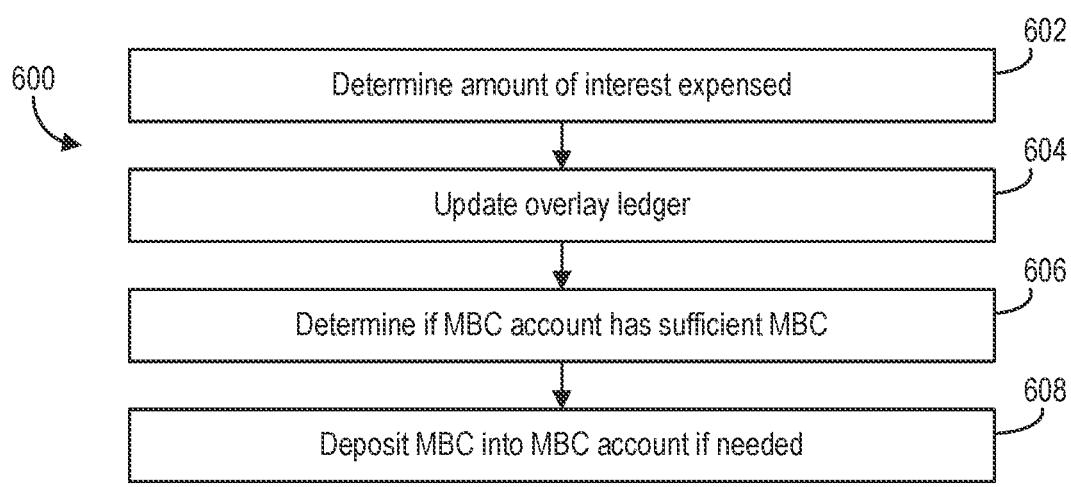
FIG. 6 is a flow diagram of a method of applying interest to a MBC deposit account is shown according to an example embodiment

Referring to FIG. 6, FIG. 6 shows a method 600 of applying interest to a MBC deposit account according to an example embodiment. As discussed above with respect to method 400, the above described financial institution systems are capable of securing MBC for the purposes of maintaining deposit accounts. One advantage of storing currency in a deposit account is the possibility of accruing interest on the stored MBC. Method 600 begins after a holder opened a MBC deposit account with a designated amount of MBC (e.g., as discussed above with respect to method 400). The financial institution determines an amount of interest expensed (i.e., the amount of interested earned by a deposit customer) on the MBC deposited in the account (602). The account balance processor 212 may calculate the amount of interest expensed. The amount of interest expensed may depend on an amount of MBC stored in the account, a number of accounts associated with a given account holder, an exchange rate of MBC to a fiat currency, loan interest rates, general economic factors, and other factors.

The overlay ledger 128 maintaining MBC deposit account information is updated to reflect the calculated amount of interest earned (604). The overlay ledger 128 is updated by the account balance processor 212 to reflect the new balance of the account with the associated interest.

The financial institution determines whether the amount of MBC in the MBC account should be updated (606). In some situations, the accrual of interest triggers the purchase or transfer of additional MBC into the pooled account 126 (i.e., the amount of interest may trigger a capital call). In certain situations, the financial institution 102 is required to maintain a threshold level of MBC on hand and ready to be transferred. For example, the financial institution may be required to maintain a certain amount of capital on hand to meet any statutory capital requirements, leverage ratio requirements, and liquidity ratio requirements (e.g., the financial institution may be required to maintain between 5-10% of the total amount of MBC accounted for in the overlay ledger 128 in the pooled account 126). In other situations, the accrual of interest is merely updated on the ledger 128. If it is determined that the amount of MBC is not sufficient, the financial institution purchases or transfers additional MBC for deposit into the pooled account (608). As will be appreciated, in practice, the ratio of the amount of on-hand MBC to the amount of MBC deposits may be maintained on an aggregate basis as opposed to each time a transaction is conducted.

Figure 7:
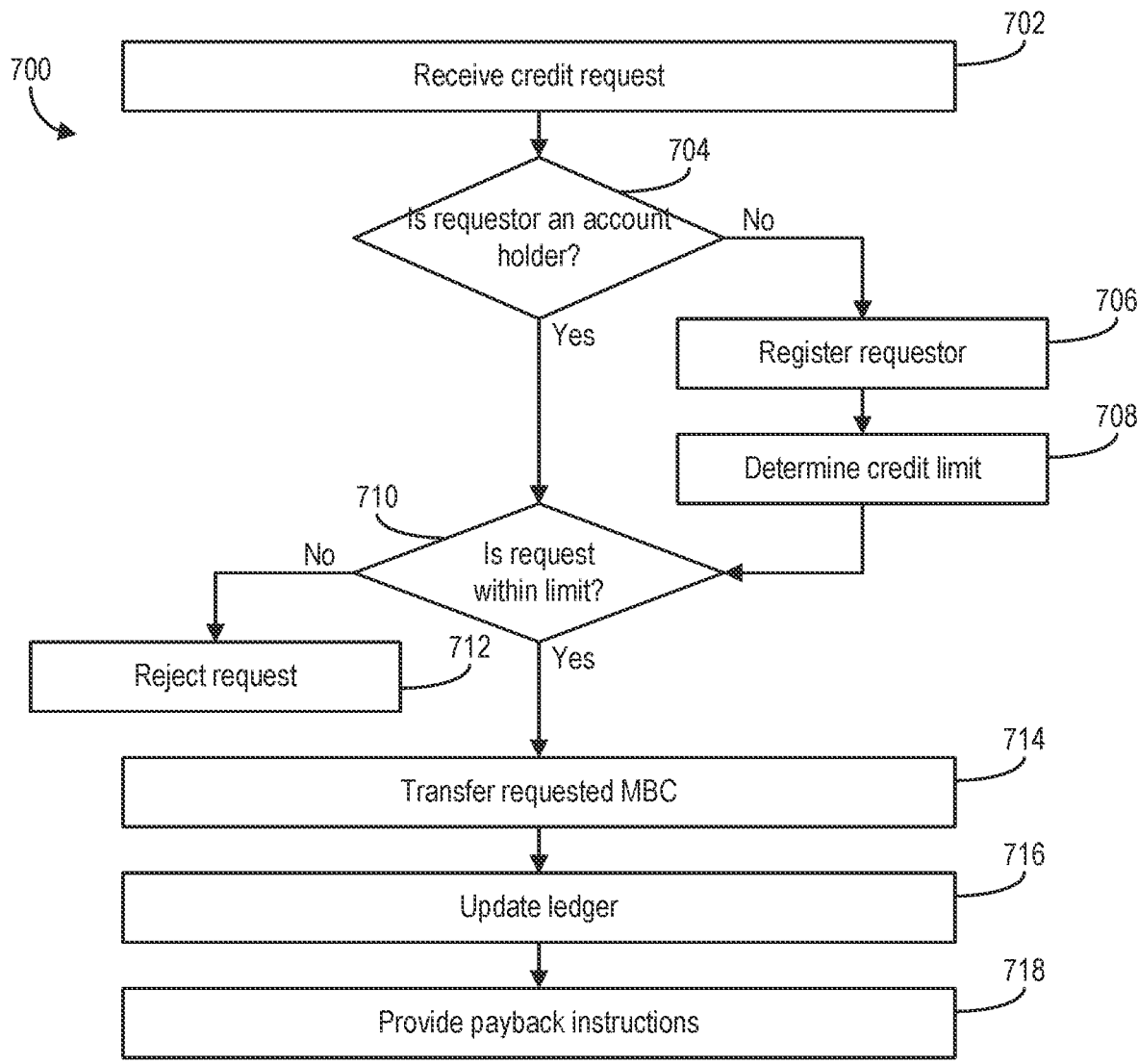
FIG. 7 is a flow diagram of a method of providing credit in MBC based on a credit request is shown according to an example embodiment.
Figure 8:
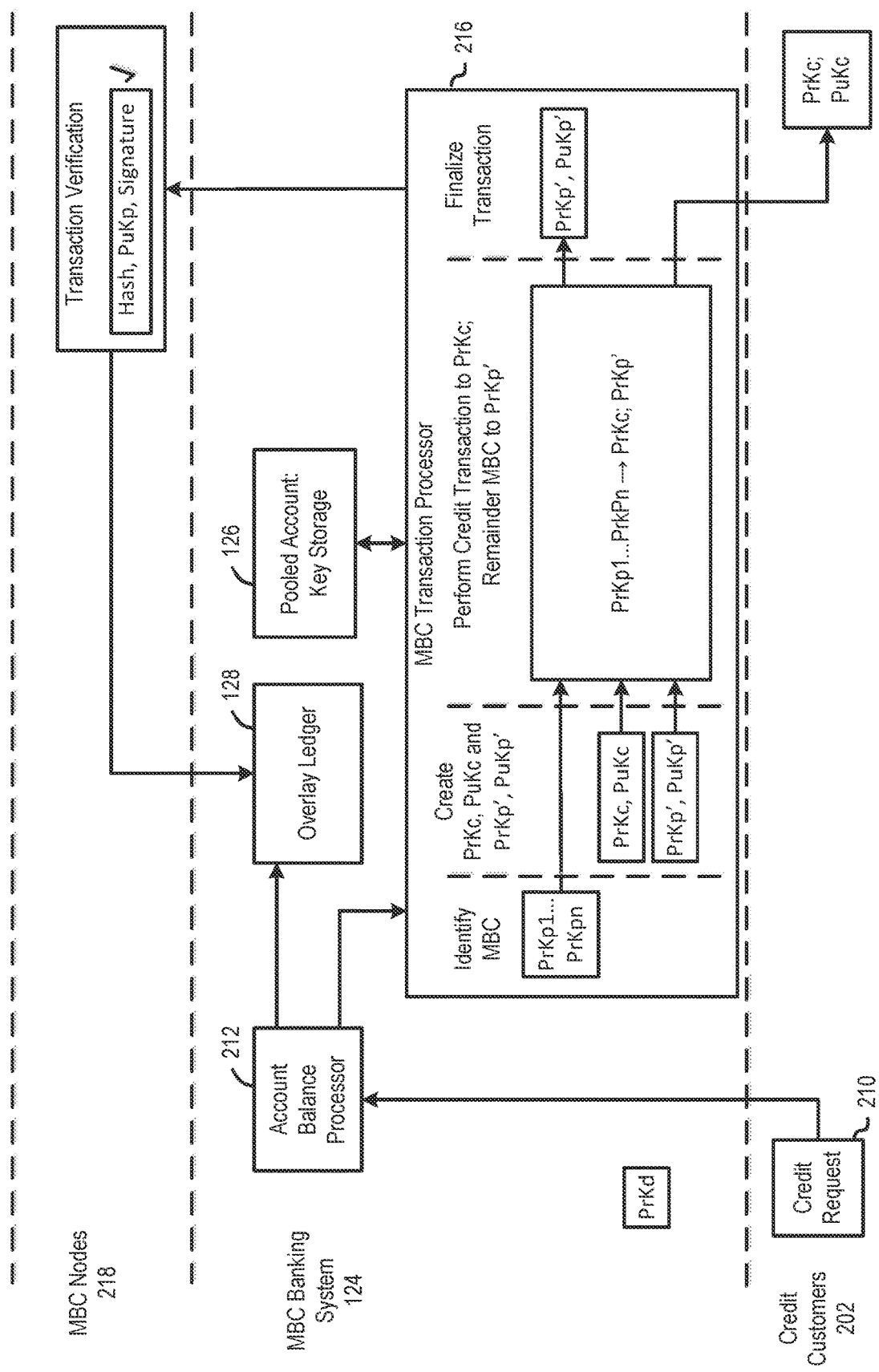
FIG. 8 is a flow diagram of how the credit transaction of FIG. 7 is carried out by a financial institution is shown according to an example embodiment.

Referring to FIGS. 7 and 8, FIG. 7 shows a method 700 of providing credit in MBC based on a credit request according to an example embodiment. FIG. 8 shows a flow diagram of how the credit transaction is carried out by the financial institution 102. FIG. 8 shows the interaction of structural components of FIG. 1 in accordance with the process steps of FIG. 7. As described in further detail below, the credit transaction for a credit customer 204 includes a transfer of funds from the financial institution to the credit customer 204. Method 700 begins when a credit request is received (702). The credit request 210 is initiated by a credit customer 204 and is received at an account balance processor 212 of the financial institution 102. The credit request 210 includes an amount of MBC requested and an identity of the credit customer 204. The request may also include an associated location (i.e. a public key associated with the credit customer 204) to which the MBC is to be transferred.

After receiving the request, the financial institution verifies the credit customer's identity (704). The credit request may be received in various forms. For example, the request may be received in the form of a transaction approval when a customer is at a point of sale. For example, a merchant point of sale device may be request approval for a credit transaction in connection with an MBC-based credit card held by the customer. As another example, the customer may have an open line of credit with the financial institution. As yet another example, the credit request may be received in connection with a loan that may be secured by collateral (e.g., a home loan, a car loan, etc.).

If the credit customer does not have a credit account with the financial institution, the financial institution registers the customer with a new credit account (706). To register the credit requestor, the financial institution requests information from the holder in order to open a MBC credit account. The information includes information relating to the requestor, such as any of name, date of birth, social security number, tax identification numbers, credit report information, biometric information, and the like. The financial institution 102 knows the identities of its customers 104. The identity information may not be shared with the external MBC system (e.g., the MBC nodes 218 are unaware of the identities of the customers 104). If the customer has other existing accounts with the financial institution (e.g., a demand deposit account), the information associated with that account may be used to reduce the information requested from the customer. After the requestor provides the required information, the financial institution determines a credit limit (e.g., in the case of a credit card, open line of credit, etc.) or credit amount for the requestor (708). The credit limit indicates the maximum amount of MBC that the requestor can borrow from the financial institution.

If the credit customer 204 is already registered or after the credit customer 204 has been registered, the financial institution determines whether the credit request is within the amount of credit available (710). The account balance processor 212 cross references the overlay ledger 128 to determine if the credit request is within the amount of credit available to the credit customer 204. If the amount of request causes the requestor to exceed his credit limit, the request will be denied (712). For example, if a credit customer 204 has a credit limit of 200 MBC, and the request is for 250 MBC, the financial institution will deny the credit request. If the amount of the request is within the credit limit, the requested amount of MBC is transferred to the credit customer 204 (714). The details of the transfer from the financial institution 102 to the credit customer 204 are described with respect to FIG. 8.

Generally, during the transfer of MBC to the credit customer 204, the MBC transaction processor 216 performs a transfer from MBC stored in the pooled account 126 to a new address, and the new address is provided to the credit customer 204. At the start of the transfer, the MBC transaction processor 216 receives the credit request information from the account balance processor. Based on the information, the MBC transaction processor 216 identifies addresses (i.e., public and private key pairs) associated with MBC in the pooled account 126. As a general proposition, typically, there will not be a single address having the exact amount of MBC in the credit request 210. Accordingly, the MBC transaction processor 216 may identify a single address associated with more than the requested amount of MBC or a plurality of addresses (e.g., PrKp1+PrKpn) that total more than the requested amount of MBC. Then, the MBC transaction processor 216 may create two new addresses (i.e., two new private key and public key pairs). A first pair of keys (PrKc, PuKc) is created, which will ultimately be provided to the credit customer or provided to the recipient of the funds in the credit transaction (e.g., a merchant). A second pair of keys (PrKp', PuKp') receives the excess MBC (i.e., the remaining MBC change from the transaction) for return to the pooled account 126. The MBC transaction processor 216 initiates the transaction from the identified address or address from the pooled account 126 to the two new addresses in the appropriate amounts. The private and public key pair associated with the MBC change left over from the transaction (i.e., PrKp' and PuKp') is stored in the pooled account 126. The private and public key pair associated with the MBC of the credit request 210 (i.e., PrKc and PuKc) is provided to the customer 204 (e.g., transmitted to a customer computing device). The MBC transaction processor 216 broadcasts details relating to the transfer to the MBC nodes 218 for verification of the transaction (in the same manner as discussed above).

After the MBC is provided to the credit customer, the overlay ledger 128 is updated (716). The account balance processor 212 updates the overlay ledger 128 to associate the amount of MBC loaned to the credit customer 204 with the credit customer 204. The overlay ledger 126 may also be updated by the account balance processor 212 after the transfer is verified by the MBC nodes 218.

In an alternative arrangement, the recipient of the funds of the credit transaction may be the customer's deposit account within the financial institution. In such an arrangement, the credit transaction is achieved without a physical transfer of MBC by updating the overlay ledger 128. For example, the customer's credit account balance may be updated in the overlay ledger 128 to indicate that a certain amount of MBC credit has been issued by the financial institution, and the customer's deposit account balance may be updated in the overlay ledger 128 to indicate that the amount of MBC associated with the credit request is available in the deposit account.

Credit payback instructions are provided to the credit customer (718). In such an arrangement, the payments are received in a similar manner as discussed above with respect to receiving deposits of MBC (e.g., in a similar manner as method 400 as discussed above with respect to FIGS. 4 and 5). In other arrangements, the requestor has a MBC deposit account with the financial institution. In this arrangement, the customer can repay the loan by transferring MBC from the deposit account back to the financial institution. This may be achieved without a physical transfer of additional MBC by updating the overlay ledger 126.

Figure 9:
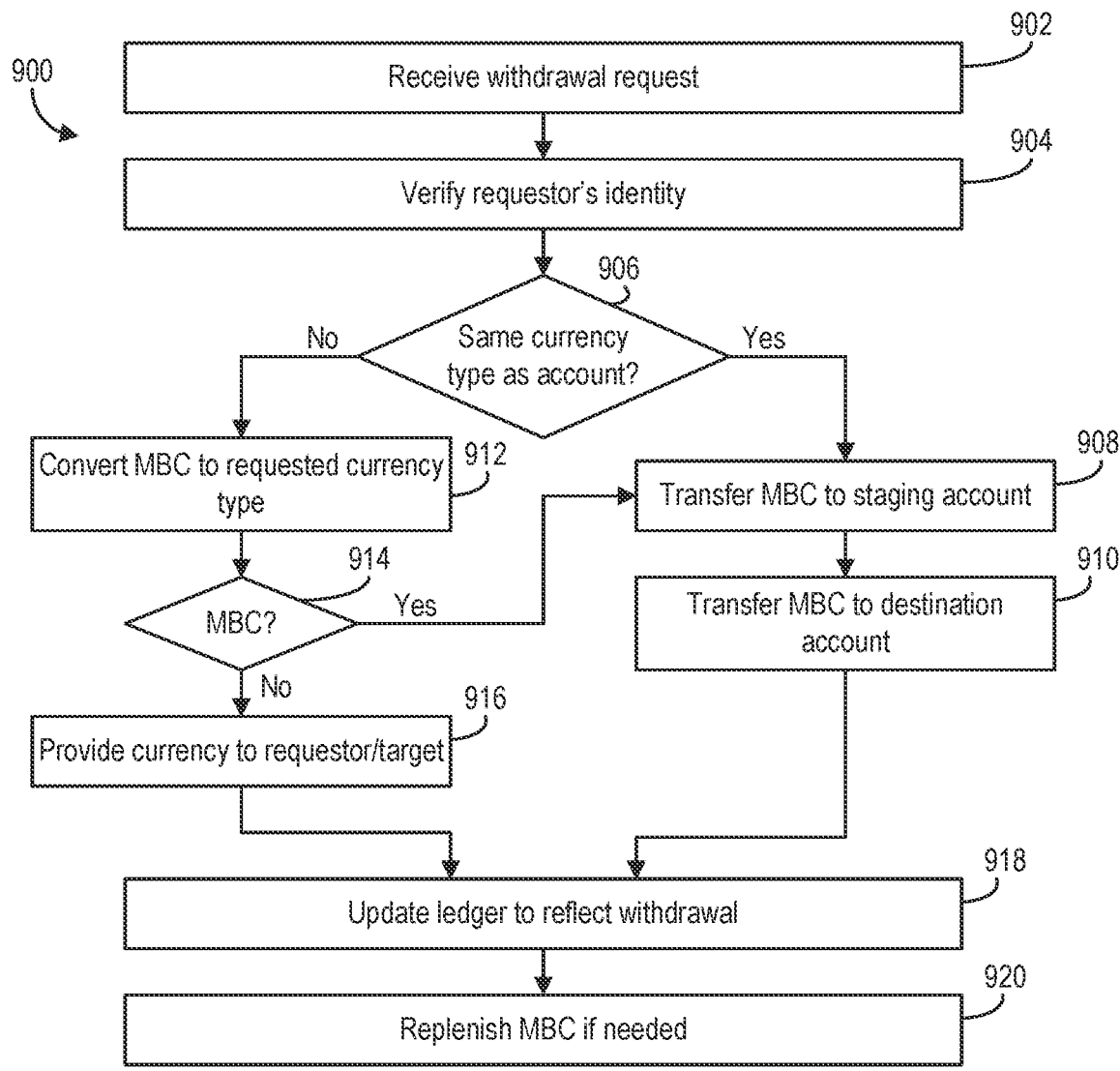
FIG. 9 is a flow diagram of a method of performing a withdrawal transaction from a MBC account with a financial institution is shown according to an example embodiment.
Figure 10:
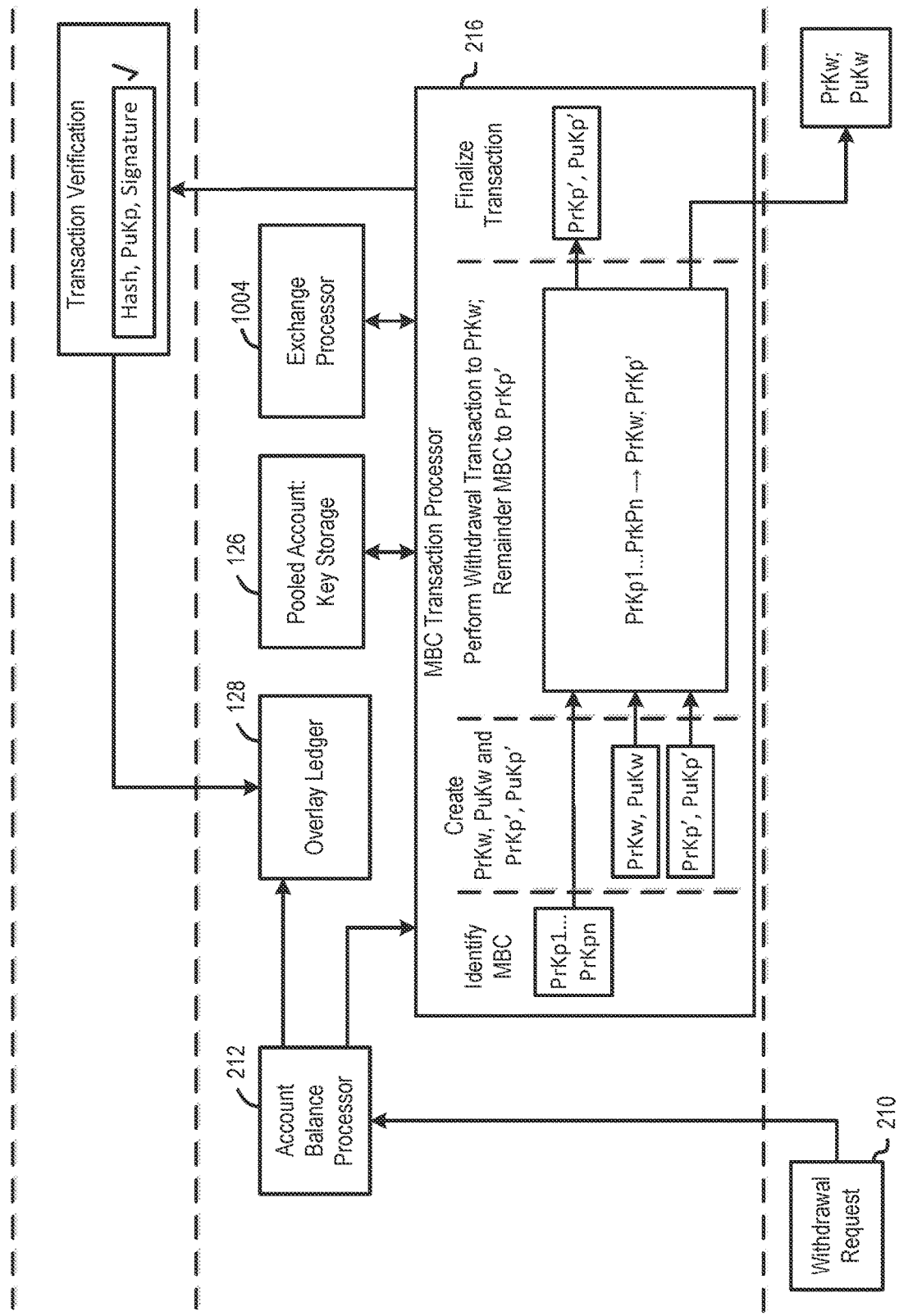
FIG. 10 is a flow diagram of how the withdrawal transaction of FIG. 9 is carried out by a financial institution is shown according to an example embodiment.

Referring to FIG. 9, a method 900 of performing a withdrawal transaction out of a MBC account with a financial institution is shown according to an example embodiment. Referring to FIG. 10, a flow diagram of how the withdrawal transaction is carried out by the financial institution 102 is shown. FIG. 10 shows the interaction of structural components of FIG. 1 in accordance with the process steps of FIG. 9. As described in further detail below, the withdrawal transaction for a deposit customer 202 is similar to the above described credit transaction (as discussed above with respect to method 700). Unlike the credit transaction, the withdrawal transaction includes a withdrawal against a MBC deposit account instead of a loan against a MBC credit account. The withdrawal out of the MBC account may be effectuated in MBC or fiat currency.

The withdrawal transaction begins when a withdrawal request is received (902). The withdrawal request 1002 is initiated from a MBC account holder and is received by an account balance processor 212 of the financial institution 102. The request may include any of an identity of the deposit customer 202, an amount of MBC to withdraw, an identity of the MBC account containing the MBC, an output currency type, a destination for withdrawn funds (e.g., an account or address associated with the a recipient of the funds such as another financial institution or a third party, etc.), or a combination thereof. In some arrangements, the request is transmitted from a user device (e.g., a personal computer, a smartphone, etc.) and received by the account balance processor 212. In other arrangements, the request is initiated by an employee of the financial institution entering data into a computing system (e.g., an employee terminal connected to the server of the financial institution) during a person-to-person interaction. For example, the holder may walk into a branch location of the financial institution and initiate the withdrawal request via interaction with a teller at the branch. In further arrangements, the request is initiated through an ATM.

After the request is received, the deposit customer's identity is verified (904). The financial institution 102 verifies the identity of the deposit customer 202 as the account holder associated with the MBC account in the request or as an authorized user. The deposit customer 202 may provide information (e.g., a PIN, a password, a biometric, an answer to a security question, etc.) to the financial institution 102. The financial institution 102 uses the provided information to verify the identity by comparing the provided information with previously verified information stored in a computing system of the financial institution.

After the identity of the deposit customer is verified as an account holder, the type of currency requested out of the MBC account is compared to the type of currency in the MBC account (906). The deposit customer 202 associated with the MBC account may withdraw funds from the account in a currency other than the MBC. For example, although the MBC account maintains a balance of MBC, the deposit customer 202 may withdraw fiat currency from the MBC account (e.g., via an ATM). As another example, although the MBC account maintains a balance of a first type of MBC (e.g., Bitcoin), the account holder may choose to transfer funds to another party in a second type of MBC (e.g., Dogecoin). The MBC transaction processor 216 compares the requested currency type with the currency type of the MBC account.

If the desired currency of the withdrawal request is the same MBC type that is in the MBC account, the requested amount of MBC is transferred from the financial institution to the deposit customer (908). The transfer occurs in the same manner as discussed above with respect to method 700 (e.g., in the same manner as described above with respect to 714). The withdrawn MBC is provided to the deposit customer in the form of a public key and private key pair (PuKw and PrKw). If the desired currency of the withdrawal request is not in the same currency as the MBC account, the currency in the MBC account is exchanged for the desired currency type (910). An exchange processor 1004 within the MBC banking system 124 determines the appropriate amount of MBC to withdraw from the account to provide the requested amount of the desired currency type. The currency may be exchanged internally within the financial institution or externally through a third-party MBC exchange market. The exchange may facilitate the exchange of a first type of MBC for a second type of MBC, the exchange of MBC to fiat currency, or the exchange of fiat currency to MBC. In other situations, currency is not actually exchanged, but the transfer is effectuated through updating of the overlay ledger 128 (e.g., if the financial institution maintains accounts in multiple types of MBC). As noted above, in some situations, the MBC within the account is exchanged to a second type of MBC. The MBC transaction processor determines whether the exchanged to currency is a second type of MBC (912). If the MBC is exchanged to a second type of MBC, the second type of MBC is then transferred to its destination address in the same manner as discussed above with respect to 908. If the MBC is exchanged into a traditional fiat currency, the currency is provided to the deposit customer 202 or to the recipient of the withdrawal (914). For example, if the requestor requests a withdrawal from a MBC account in U.S. Dollars at an ATM, the ATM would dispense the requested amount of U.S. dollars to the requestor.

In either of the above described situations (fiat currency withdrawal or MBC withdrawal), the overlay ledger is updated to reflect the withdrawal (916). The account balance processor 212 updates the overlay ledger 128 to associate the amount of MBC withdrawn to the deposit customer 202 account within the overlay ledger 126. The overlay ledger 126 may also be updated by the MBC nodes 218 or the account balance processor 212 after the transfer is verified by the MBC nodes 218.

If necessary, the financial institution replenishes MBC into the pooled account 126 MBC (918). As discussed above, in certain situations, the financial institution 102 is required to maintain a threshold level of MBC on hand and ready to be transferred. For example, the financial institution 102 may be required to maintain a certain amount of capital on hand to meet any statutory capital requirements, leverage ratio requirements, and liquidity ratio requirements (e.g., the financial institution may be required to maintain between 5-10% of the total amount of MBC accounted for in the overlay ledger 128 in the pooled account 126). If it is determined that the amount of MBC is not sufficient due to the withdrawal, the financial institution 102 purchases or transfers additional MBC for deposit into the pooled account 126.

As described above, the financial institution 102 allows MBC customers of the financial to utilize advantages of banking services that are normally associated with fiat banking services. These banking services include the accrual of interest on MBC (e.g., as discussed above with respect to method 600), credit services in MBC (e.g., as discussed above with respect to method 700), the use of bank ATMs (e.g., as discussed above with method 900), and the like. Additionally, the above-described financial institution 102 may provide insurance on MBC deposit accounts. The insurance may be provided up to a certain limit of MBC (i.e., a certain quantity of MBC or a certain equivalent value of MBC in a designated fiat currency). The government may provide the insurance (e.g., via the FDIC), by the financial institution 102, or by a private insurer. In other embodiments, the financial institution may provide the insurance.

Figure 11:
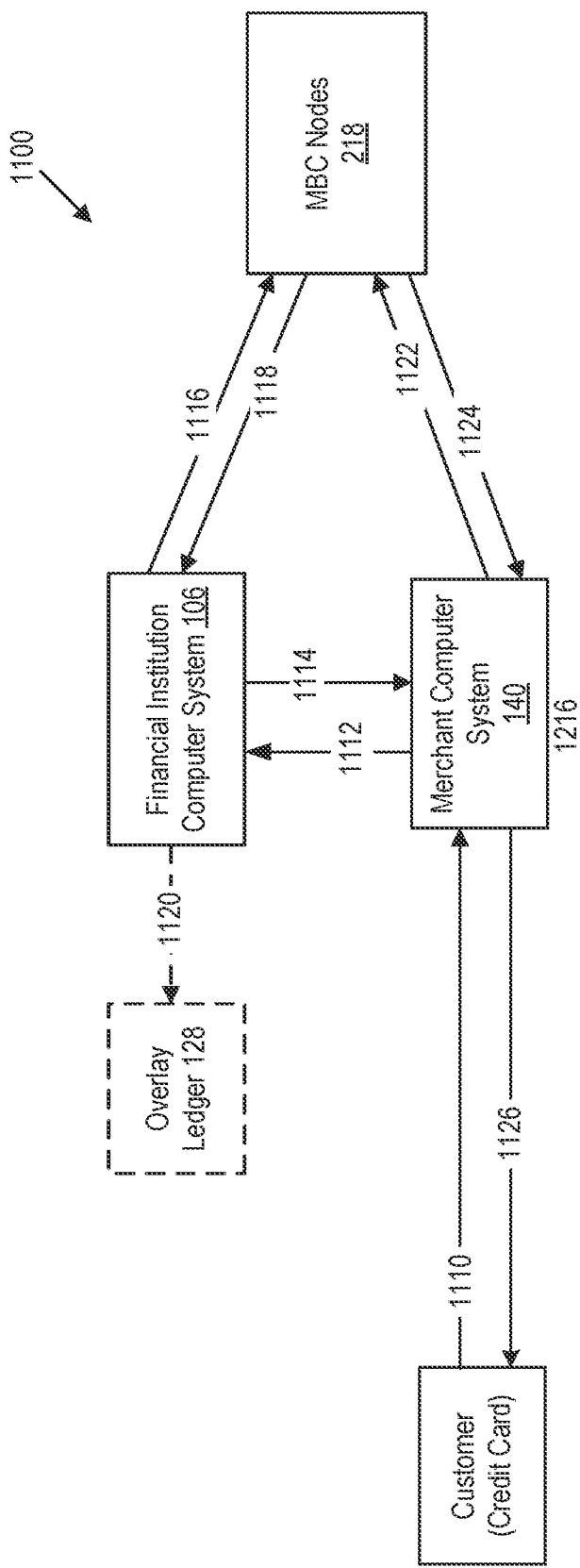
FIG. 11 illustrates a flow diagram that may be implemented by the systems in FIGS. 1-10.

Referring now to FIGS. 11-15, various examples of MBC transactions are disclosed. Referring first to FIG. 11, as indicated above (in connection with the discussion of step 704 of FIG. 7), a credit transaction request may be received by the financial institution computing system 106 in the form of a transaction approval request when a customer is at a point of sale. Specifically, for example, a merchant point of sale device may request approval for a credit transaction in connection with an MBC-based credit card held by the customer.

Hence, as shown in FIG. 11, at step 1110, the customer may hand the credit card to a store employee, and the employee may swipe the card through a card reading mechanism of the point of sale device. As another example, the customer may swipe the card through a card reading device. As indicated below, the arrangement of FIG. 11 may also be used for online transactions.

At step 1112, once the card is swiped, the transaction may be submitted to the financial institution computing system 106 for approval. For example, the point of sale system may recognize the credit card as an MBC credit card issued by the financial institution computer system 106. The point of sale system may then establish a connection with the financial institution computing system 106, and the approval may be requested from the financial institution computing system 106 and payment may be processed via the connection.

In some embodiments, in which multiple financial institutions issue MBC credit cards, and the MBC credit card is susceptible (from the perspective of the merchant point of sale device) to having been issued by any one of the multiple financial institutions, the merchant point of sale device may be configured to determine which of the financial institutions issued the MBC credit card involved in the particular transaction. For example, the point of sale device may extract information from the token which permits the point of sale device to determine which financial institution issued the MBC credit card involved in the transaction. The point of sale system may therefore execute software that is interoperable with MBC credit cards of different financial institutions. Other aspects of such an arrangement are described in greater detail below in connection with FIG. 14, in which a mobile wallet provider interoperates with MBC credit cards issued by different financial institutions.

At step 1114, the private and public key pair associated with the MBC of the credit request 210 (i.e., PrKc and PuKc) may be created and provided to the provided to the customer 204. For example, the public and private key pair may be transmitted to the point of sale device in payment of the purchase transaction being made by the customer. At steps 1116 and 1118, the MBC transaction processor 216 of the financial institution computing system 106 broadcasts details relating to the transfer to the MBC nodes 218 for verification of the transaction (in the same manner as discussed above).

At step 1120, after the MBC is provided to the credit customer, the overlay ledger 128 is updated (716). The account balance processor 212 updates the overlay ledger 128 to associate the amount of MBC loaned to the credit customer 204. The overlay ledger 126 may also be updated by the account balance processor 212 after the transfer is verified by the MBC nodes 218. At steps 1122 and 1124, the MBC transaction is verified by the merchant computer system 140 via the MBC nodes 218. For example, the merchant computer system 140 may confirm that the verification information published by the MBC nodes 218 in a chain of transactions (i.e., a blockchain) accurately reflect that a valid transaction occurred. At step 1126, confirmation of the transaction (e.g., a store receipt) is provided to the customer 204.

In other embodiments, the transaction depicted in FIG. 11 may be implemented in other ways. For example, in some embodiments, rather than the financial institution computing system 106 creating and communicating a new public key/private key pair to the merchant point of sale device, the merchant point of sale computing system may create a new public key/private key pair. In such an embodiment, the merchant point of sale system may communicate the public key to the financial institution computing system 106 via the established connection, and the financial institution computing system 106 may transfer the approved payment to the received public key.

In some embodiments, the customer 204 may be provided with a single physical credit card that is associated with both an MBC credit card account and a fiat currency credit card account. If the merchant point of sale system recognizes the credit card as being associated with an MBC credit card account at the financial institution 102, and if the merchant accepts such MBC transactions with the financial institution 102, then the credit card payment may be processed using the arrangement shown in FIG. 11. Conversely, if the merchant point of sale system does not recognize the credit card as being associated with an MBC credit card account at the financial institution 102, and does not accept such MBC transactions, then the credit card payment may be processed as a conventional fiat currency payment through an open loop credit card processing network (e.g., a processing network such as Visa, Mastercard, Discover, American Express, and so on).

In other embodiments, the MBC credit card is supported by an open loop card processing network. In such embodiments, the MBC credit card may instead be processed via the open loop card processing network. That is, approval for the MBC transaction may be requested from the financial institution computing system 106 via the open loop processing network and payment may be processed through the open loop processing network. For example, an acquirer/processor computer system associated with the merchant point of sale device may be interposed between the merchant point of sale device and the financial institution computing system 106. The acquirer/processor computer system may submit the approval request to the financial institution computing system 106, may receive an MBC payment from the financial institution computing system 106 in the amount of the approved transaction amount, and may subsequently transfer the received MBC amount to the merchant associated with the point of sale device. In such an embodiment, information may be stored on a magnetic stripe of the credit card in Track 1/Track 2 format to facilitate processing of the credit card transaction.

In other embodiments, instead of the point of sale being used in an in-person transaction, the point of sale system may be a remote server system used to implement an on-line transaction. For example, rather than swiping the credit card at the point of sale, credit card account information may be entered manually online in connection with a checkout page of an online merchant. Also, as will be appreciated, although FIG. 11 is discussed in terms of a credit card transaction, the systems and process described therein may also be used in connection with other types of card-based transaction, such as debit cards, stored value cards, and so on.

Referring now also to FIGS. 12-15, FIGS. 12-15 show a mobile wallet arrangement implemented in the context of the MBC banking system of FIGS. 1-10. In various embodiments, the mobile wallet arrangement may allow a user to make or receive a payment from another entity, such as a merchant or another person. Again, the payments may be made when the sender and recipient are in close proximity (e.g., when the user is making a purchase at a bricks and mortar merchant) or when the sender and recipient are remote from each other (e.g., when the user is making a purchase from an online merchant). In some embodiments, the source account for the mobile wallet payment may be an account held at the financial institution 102, e.g., an MBC credit card account in which the mobile wallet computing system 130 has sufficient information about the account (e.g., a credit card account number and related information) to initiate processing of transactions in connection with the account. In other embodiments, the source account for the mobile wallet payment may be an account held at the mobile wallet provider 103, e.g., in situations where the mobile wallet provider 103 is also a financial institution. For example, the source account may be a demand deposit account held at the mobile wallet provider 103, such that the demand deposition account is periodically replenished from an account held at the financial institution 102.

Figure 12:
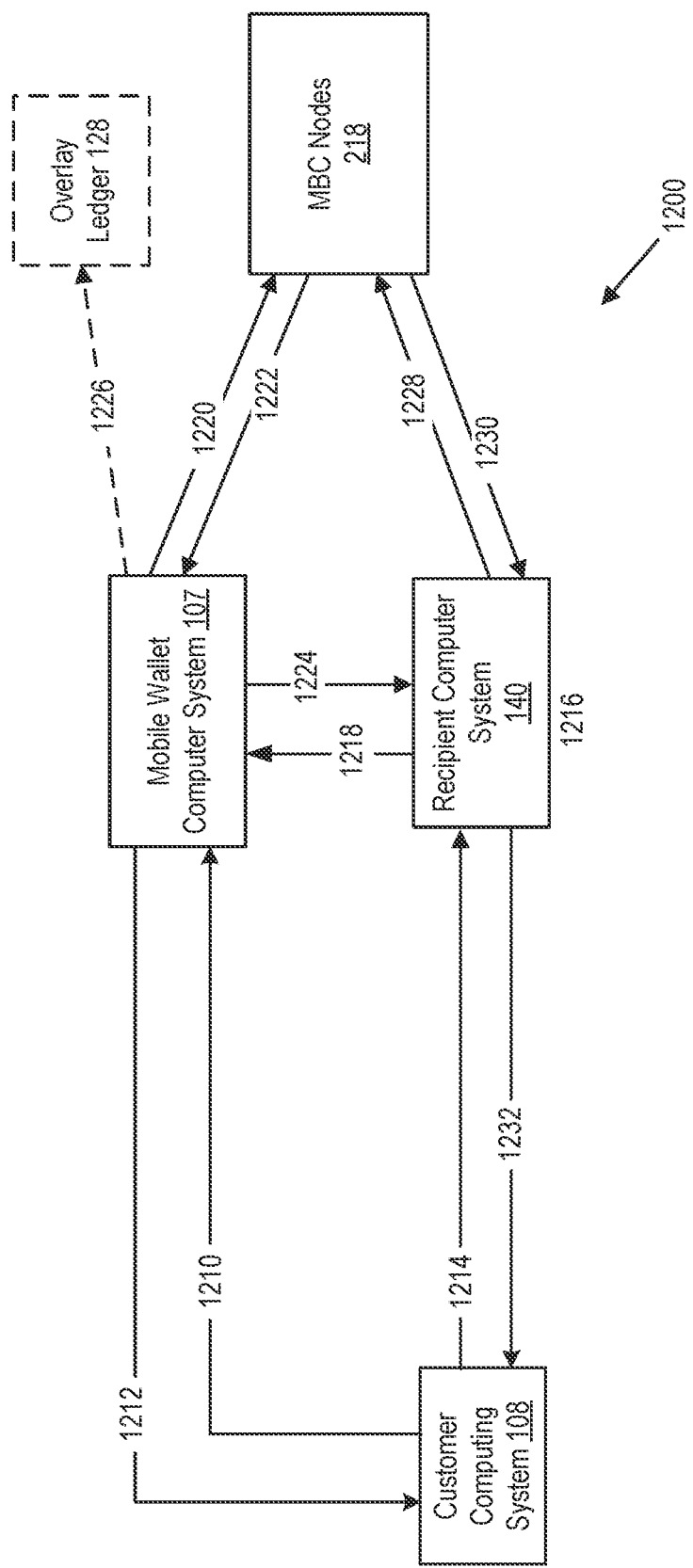
FIG. 12 illustrates a flow diagram that may be implemented by the systems in FIGS. 1-10.
Figure 13:
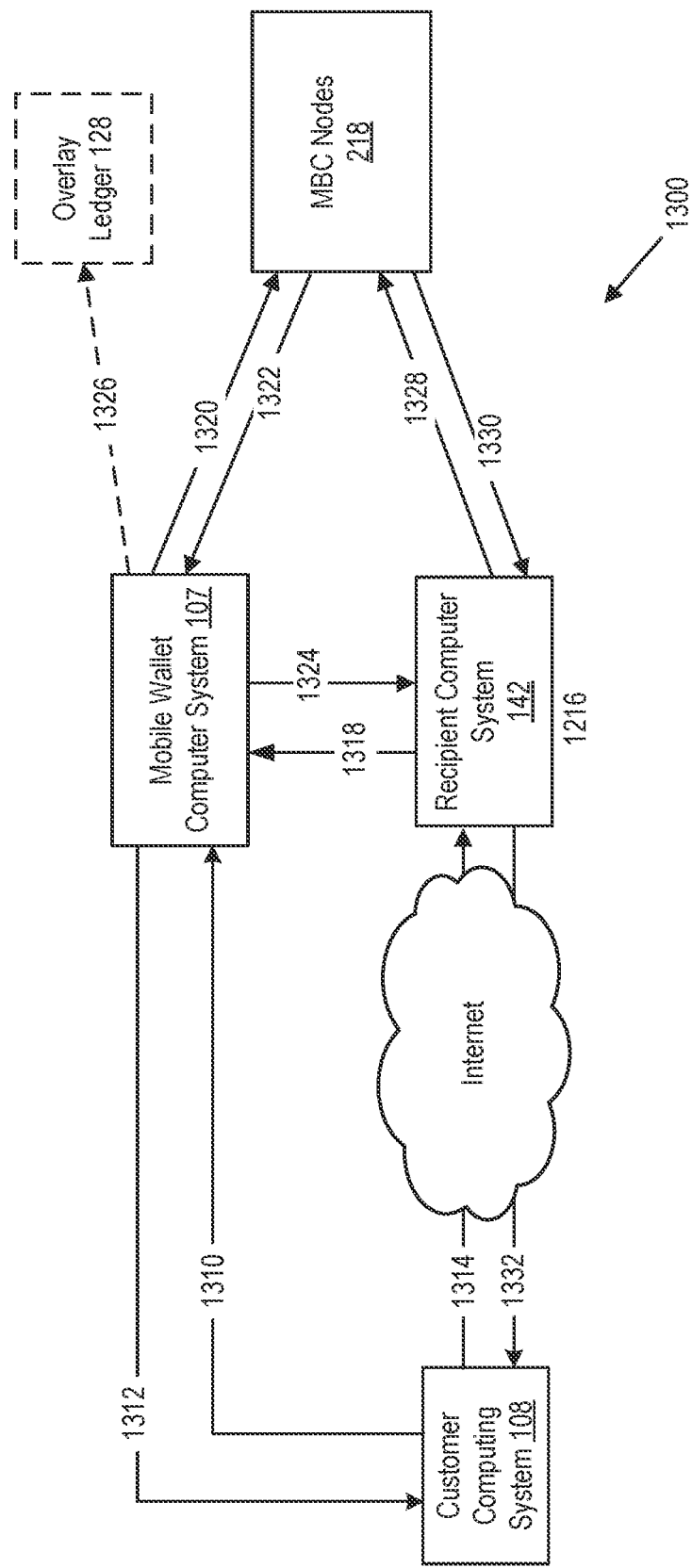
FIG. 13 illustrates a flow diagram that may be implemented by the systems in FIGS. 1-10.
Figure 14:
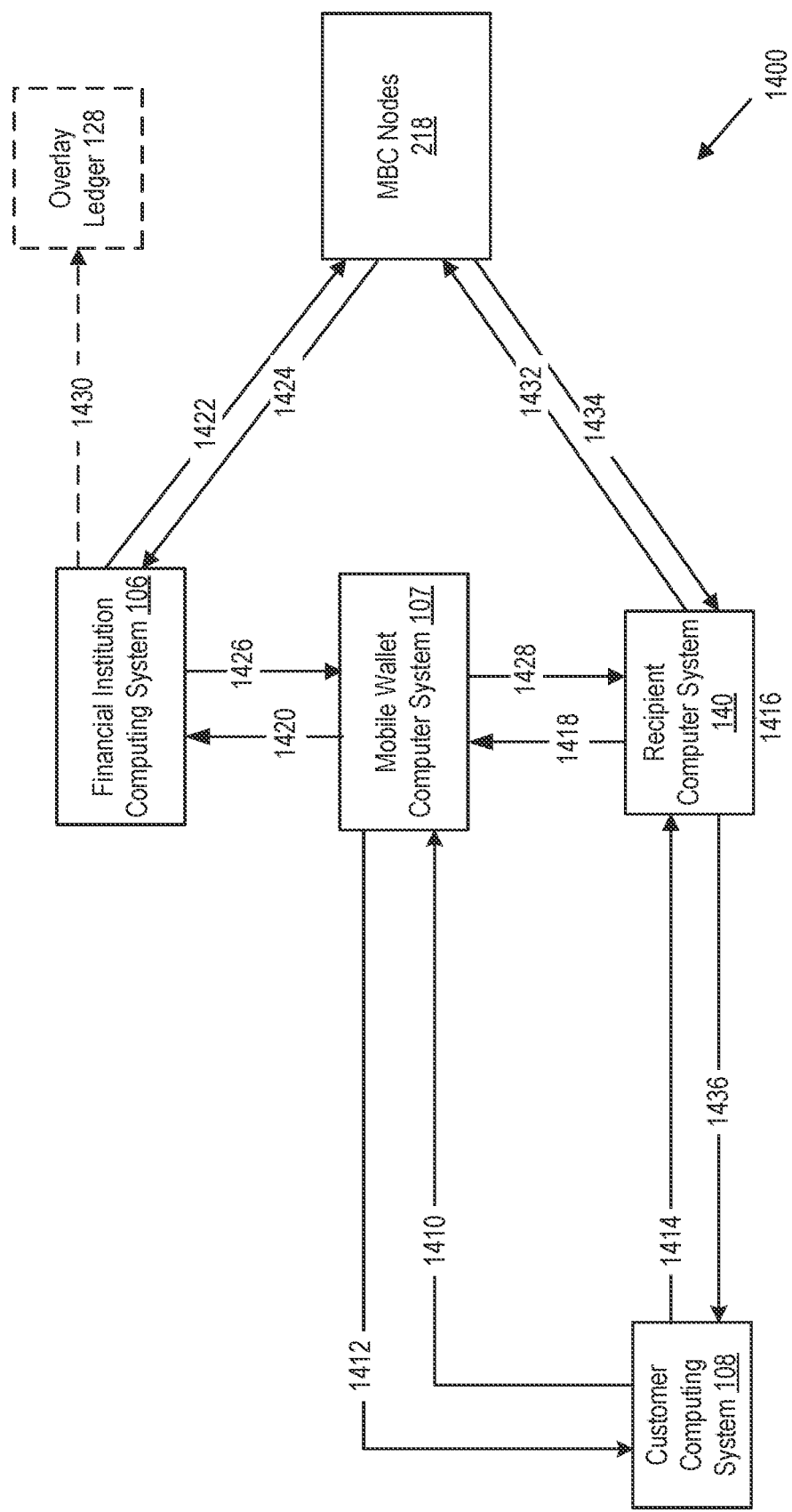
FIG. 14 illustrates a flow diagram that may be implemented by the systems in FIGS. 1-10.
Figure 15:
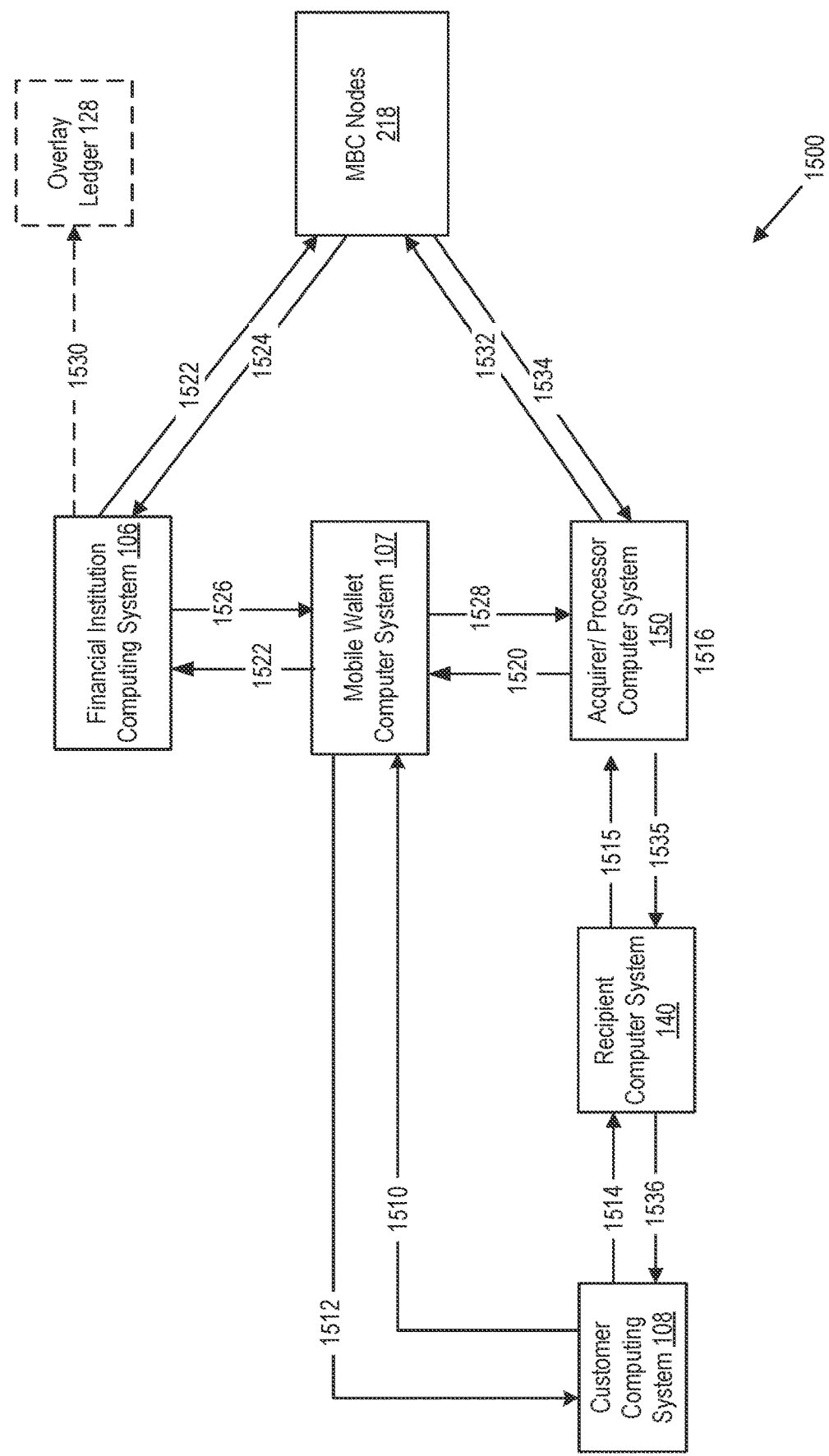
FIG. 15 illustrates a flow diagram that may be implemented by the systems in FIGS. 1-10.

As will be appreciated, numerous various implementations of a mobile wallet arrangement are possible. FIG. 12 illustrates a process that may be implemented (for example) when the sender and recipient are in close proximity and in which the source account for the mobile wallet transaction is a MBC demand deposit account held at the mobile wallet provider 103. FIG. 13 illustrates a process similar to that of FIG. 12 except that is implemented when the sender and recipient are not in close proximity. FIG. 14 illustrates a process that may be implemented when the source account is an MBC credit card account held at a financial institution 102 that is a different entity than the mobile wallet provider 103, and in which the MBC credit card is not supported by an open loop processing network. FIG. 15 illustrates a process similar to that of FIG. 14, except that the MBC credit card is supported by an open loop processing network. Various other permutations and examples are also provided throughout the discussion of FIGS. 12-14, below.

Referring first to FIG. 12, at step 1210, the customer computing system 108 requests access to funds of the MBC accounts held by the user via the mobile wallet computer system 107, e.g., to pay for a good or service at a merchant location, to pay to another person, and so on. When a user wishes to make a payment to a merchant or a person, for example, the user may access the client application 120 by entering a PIN or other login credentials and then selecting a "pay now" or similar button. For example, the user may be located at a merchant location and may wish to pay for a good or service. In some embodiments, the customer computing system 108 may provide a PIN, a customer ID, and/or a device ID to the mobile wallet computer system 107. The PIN may be a number entered by the user on the computing system 108 to gain access to the mobile wallet application. The customer ID may be an identification code that is uniquely associated with the user and that is stored on the computing system 108. The device ID may be an identification code that is uniquely associated with the computing system 108 and that is stored on the computing system 108. The user may be identified and authenticated based on a match with the provided data elements with information stored in the mobile wallet computer system 107. Further, the user's mobile wallet account information may be located/determined by the mobile wallet computer system 107.

Next, at step 1212, the mobile wallet computer system 107 may generate a token that may be communicated to the other party to implement the transaction. In some embodiments, the token is transmitted by the mobile wallet computer system 107 to the sender of the funds, and then by the sender of the funds to the recipient of the funds, whereafter the recipient returns information in the token back to the mobile wallet computer system 107 for processing of the transaction. In other embodiments, the token is transmitted by the mobile wallet computer system 107 to the recipient of the funds, and then by the recipient of the funds to the sender of the funds, whereafter the sender returns information in the token back to the mobile wallet computer system 107 for processing of the transaction. For purposes of providing an example, it is assumed herein that the token is first transmitted by the mobile wallet computer system 107 to the sender of the funds (e.g., customer computing system 108).

The token that is generated may have various information embedded therein. The information that is contained in the token may vary in differing embodiments. In the example of FIG. 12, it is assumed that the source account may is a MBC demand deposit account held at the mobile wallet provider 103. In such an embodiment, the token may embed any code that may be used by the mobile wallet computer system 107 to uniquely identify the transaction, i.e., such that the mobile wallet computer system 107 can process the transaction once the code is passed to the mobile wallet computer system 107 by recipient computer system 140. The code, for example, may be devoid of any information that identifies an account number of the customer (i.e., may be completely of any portion of an account number of the customer). In other embodiments, more account-identifying information may be included.

After the token is generated, also at step 1212, the token may be transmitted to the customer computing system 108 via a wired or wireless network. The token may be transmitted to the customer computing system 108 with authentication information so that the customer computing system 108 may be able to verify the identity of the mobile wallet computer system 107.

At step 1214, the customer computing system 108 may display or otherwise transmit the token to recipient computer system 140 (e.g., using a QR code, NFC, wireless, Bluetooth, low energy Bluetooth, RFID, hypersonic, Wi-Fi, cellular 3G, 4G, GSM, LiFi, or other method). As previously noted, in other embodiments, the token may instead be transmitted from the recipient computer system 140 to the computing system 108.

At step 1216, the recipient computer system 140 receives the token from the customer computing system 108. In various embodiments, the recipient computer system 140 may be a point of sale device at a merchant store location capable of receiving the tokens generated by the mobile wallet computer system 107. The recipient computer system 140 also determines the amount of the transaction (e.g., rings up the customer's merchandise, computes sales tax, applies any discounts, etc.). In the case of a refund transaction at a point of sale, in which funds are transferred from the merchant to the customer, the amount of the refund transaction may be computed at the point of sale. If the recipient is a non-merchant, the amount of the transaction (i.e., the amount one customer desires to transfer to another) may be manually entered by one of the parties (e.g., the sender) into the mobile wallet application of that party.

At step 1218, the recipient computer system 140 then transmits the amount and the received token to the mobile wallet computer system 107. The recipient computer system 140 may also create a new public key/private key pair for purposes of the transaction, and transmit the public key to the mobile wallet computer system 107 as well.

In some embodiments, the recipient computer system 140 may have program code executing thereon (e.g., a special-purpose application, a plug-in to an existing POS application, etc.) which specifically configures the recipient computer system 140 to interact with the mobile wallet computer system 107 of the mobile wallet provider 103. Such program code may be executed when it is determined that the token received from the customer is associated with a mobile wallet account, causing the point of sale system to thereafter interact with the mobile wallet computer system 107 to process the transaction. A similar arrangement may be used for in-person transactions between two non-merchant users. In other embodiments, the recipient computer system 140 may have program code executing thereon which configures the recipient computer system to interact with the computer systems of numerous financial institutions. In such embodiments, the recipient computer system 140 may determine the appropriate mobile wallet computer system 107 based on the information that may be decoded from the token. For example, as previously described, in some embodiments, a portion of an account number may be embedded in the token, and such information may be used to determine where to send the transaction information for processing. A similar arrangement may be used for in-person transactions between two non-merchant users. In the case of remote transactions between two non-merchant customers, a directory may be provided by the mobile wallet computer system 107 that is configured to determine the MBC account of the sender/recipient based on the phone number, e-mail, address, or code provided by the sender/recipient. In other embodiments, to promote interoperability between mobile wallet applications of multiple financial institutions, the directory structure may be provided by third party service and accessible by each of the financial institutions.

The mobile wallet computer system 107 determines the account number of the MBC account that is held the user of the customer computing system 108. In some embodiments, the mobile wallet computer system 107 determines whether the recipient 140 has an MBC account with the same financial institution as the mobile wallet computer system 107. In the case when the recipient 140 has an MBC account with the same financial institution as the mobile wallet computer system 107, the mobile wallet computer system 107 may update the overlay ledger to increase the balance in the overlay ledger of the recipient 140 by the transaction amount and the reduce the balance of the user, in step 1226, i.e., a ledger entry that is performed without involvement of the MBC nodes 218. The overlay ledger update may occur as soon as the mobile wallet computer system 107 is capable of updating the ledger. Updating the overlay ledger 128 does not require the mobile wallet computer system 107 to contact the MBC nodes 218.

In various embodiments, at step 1220, when the recipient 140 is not registered with the mobile wallet compute system 107, the mobile wallet computer system 107 may send the transaction information to the MBC nodes 218. At step 1222, the MBC nodes 218 validate the MBC transaction between the recipient 140 and the user of the customer computing system 108 to transfer MBC funds, as previously described. The mobile wallet computer system 107 may send a message of approval to the recipient computer system at step 1224. At steps 1228 and 1230, the MBC transaction is verified by the merchant computer system 140 via the MBC nodes 218. At step 1232, the recipient 140 may generate and transmit a receipt of the transaction back to the customer computing system 108.

Referring to FIG. 13, FIG. 13 illustrates a process that may be implemented when a user and/or customer is remotely located to the recipient 140 or recipient website computer system 142. For example, the user and/or customer may be accessing a website and select the payment option of paying by mobile wallet. At step 1310, the mobile wallet computer system 107 receives a message from the customer computing system 108 to generate a token. In FIG. 13, the token that is generated may comprise a reduced amount of information as compared, for example, to the amount of information contained in Track 1/Track 2 data for a magnetic stripe of a credit card. Such an arrangement may facilitate customer-entry of the token into a purchase checkout page on a merchant website, e.g., because fewer keystrokes are required to enter the information. In one embodiment, the token may be entered using ten or fewer alphanumeric characters. In one embodiment, the token may be entered using seven or fewer numeric characters. In some embodiments, the customer computing system 108 may inform the mobile wallet computer system 107 regarding the identity of the recipient website computer system 142. At step 1314, the user may enter the received token into the recipient website computer system 142. In various embodiments, the Internet may be used as a network between the recipient website computer system 142. In various embodiments, the recipient website computer system 142 may also receive instructions from the customer computing system 108. After receiving the token, the recipient website computer system 142 may perform step 1218 by sending the token to the acquirer processor 150. Steps 1318-1332 may transmit similar messages as steps 1218-1232 from FIG. 12.

While FIGS. 12 and 13 above are primarily described in the context of implementations in which the source account for the mobile wallet transaction is a MBC demand deposit account held at the mobile wallet provider 103, it may be noted that the arrangement of FIGS. 12 and 13 may also be used in the context of an implementation in which the source account is an MBC credit card account held at mobile wallet provider 103. Arrangements in which the account is held by a financial institution 102 which is different than the mobile wallet provider 103 may also be provided. Specifically, FIG. 14 below describes an arrangement in which the source account for the mobile wallet transaction is a credit card account held at a financial institution 102 (i.e., an entity different than the mobile wallet provider 103). FIG. 15 is similar to FIG. 14, except that it shows a more interoperable arrangement in which the MBC credit card account may be processed in an open loop processing network.

Referring first to FIG. 14, similar to FIG. 12, the arrangement shown therein may be used in various scenarios, such as person-to-business payments (e.g., customer to merchant), business-to-person payments, person-to-person payments, business-to-business payments, and so on. Likewise, the arrangement may be used for both in-proximity payments and for remote payments. In the arrangement of FIG. 14, it is assumed that the sender of the payment uses MBC credit card account as a source account, and that the credit card account is at a different financial institution 102 that is different than the mobile wallet provider 103. Further, in the arrangement of FIG. 14, it is assumed for purposes of providing an example that a level of interoperability exists between MBC credit cards of different financial institutions. That is, the mobile wallet provider 103 is able to operate with MBC credit cards issued by different financial institutions, and is therefore configured to determine which financial institution issued a particular MBC credit card involved in a particular transaction.

Steps 1410 to 1418 of FIG. 14 may be performed in a manner similar to steps 1210 to 1218 of FIG. 12, as described above. In FIG. 14, however, the token that is generated may embed additional information in order to facilitate interoperalibity across MBC credit cards issued by different financial institutions. For example, in some embodiments, the token may embed a complete account number (e.g., an MBC credit card account number and other verification information) that the recipient may use to redeem payment. The credit card number may then be used by the mobile wallet computer system 107 to determine which financial institution issued the MBC credit card, and therefore which financial institution to interact with to process the MBC credit card payment. In other embodiments, at least a portion of a debit or credit card number is embedded, and the transaction is processed as a debit card transaction. In other embodiments, the token does not include a complete account number (e.g., to promote security). For example, the token may embed a portion of a credit card number but not the entire credit card number. For example, the token may include a few pseudo-randomly generated numbers and a few numbers that identify the user, or an MBC credit card account number assigned by a financial institution. In one embodiment, the token starts with a credit card issuer identification number (IIN) that corresponds to the mobile wallet computer system 107 and ends with the last four digits of the actual MBC credit card account number that is being used in the transaction. In some embodiments, the token further includes intervening digits including a trace ID. The trace ID may be embedded into a token and allows for enhanced authentication during the payment process.

After step 1418, when the token is received by the mobile wallet computer system 107, the mobile wallet computer system 107 determines the financial institution that maintains the credit card account for the transaction. At step 1420, the mobile wallet computer system 107 forwards the transaction to the computer system 106 of the appropriate financial institution for processing. The appropriate financial institution 106 is determined based on the account information (e.g., the IIN) extracted from the token. The financial institution computer system 102 may then process the transaction in generally the same manner as the mobile wallet computer system 103 processes transactions as described above in the embodiment of FIG. 12. For example, at steps 1422, the financial institution computer system 102 may send the transaction to the MBC nodes for validation. At step 1424, the MBC nodes 218 validate the MBC transaction between the recipient 140 and the user of the customer computing system 108. The overlay ledger is updated at step 1430. The financial institution computer system 102 may send a message of approval to the mobile wallet computer system 107 at step 1426, which in turn may send the message to the recipient computer system at step 1428. At steps 1432 and 1434, the MBC transaction is verified by the merchant computer system 140 via the MBC nodes 218. At step 1436, the recipient 140 may generate and transmit a receipt (or the information of a receipt) of the transaction back to the customer computing system 108.

In some embodiments, given that the verification of the transaction may not be ascertainable from the block chain for several minutes or more, depending on the math-based currency implementation that is employed, the mobile wallet provider 103 and/or the financial institution 102 may provide a credit guarantee to the merchant 142. Hence, for example, if it turns out that there is a problem with the transaction, and the customer does not have the requisite funds to complete the transaction, the mobile wallet provider 103 and or the financial institution 102 may provide a credit guarantee that ensures that the merchant gets paid anyway. This facilitates utilization of MBC in connection with large value transactions, e.g., where a merchant may otherwise be unwilling to allow a customer to leave with store merchandise until after the transaction has been verified by MBC nodes 218, which may take several minutes or more.

Referring now to FIG. 15, FIG. 15 is similar to FIG. 14, except that it shows an arrangement in which the MBC credit card account may be processed in an open loop processing network. Hence, in FIG. 15, an acquirer processor computing system 150 is interposed between the recipient computer system 140 and the mobile wallet computer system 107. Again, the acquirer processor may determine the appropriate financial institution 106 to whom to route the transaction based on the account information (e.g., the issuer identification number (IIN)) extracted from the token. The transaction is then additionally routed through the acquirer/processor computer system (steps 1515, 1535). The remaining steps 1510-1536 are performed in generally the same manner as described above in connection with steps 1410-1436 of FIG. 14.

In some embodiments, the customer may be provided with a single physical credit card that is associated with both an MBC credit card account and a fiat currency credit card account. The mobile wallet computer system 107 may be configured to determine if the merchant accepts MBC payments. If the merchant point of sale system accepts MBC payments, then the mobile wallet computer system 107 may process the transaction as an MBC transaction as discussed herein. If the merchant point of sale system does not accept MBC payments, then the mobile wallet computer system 107 may process the transaction a fiat-based currency transaction using an open loop credit card processing network. (e.g., Visa, Mastercard, Discover, American Express, and so on).

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention as defined in the appended claims. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention as expressed in the appended claims.

What is claimed is:

1. A method, comprising:
   receiving, by at least one computing system and from a customer computer system, a remote exchange request for an amount, the remote exchange request corresponding with a math based currency (MBC) account of a customer and a fiat currency account of the customer, wherein the remote exchange request is initiated upon triggering a remote exchange for a remote, card-based exchange with an online merchant;
   identifying, by the at least one computing system, a first MBC entry in an overlay ledger that reflects an MBC balance of the MBC account of the customer and a second MBC entry in the overlay ledger that reflects an MBC balance for an MBC account of the online merchant;

generating or identifying, by the at least one computing system, a first public and private key pair of the MBC account of the online merchant;

exchanging, by the at least one computing system on a published blockchain, an amount of MBC equal to the amount using the first public and private key pair of the MBC account of the online merchant;

storing, by the at least one computing system, the first public and private key pair of the MBC account of the online merchant in a pooled account database, wherein the pooled account database stores a total amount of MBC deposits and MBC credits of an institution;

updating, by the at least one computing system, the first MBC entry of the overlay ledger to modify the MBC balance of the MBC account held by the customer by the amount of MBC and the second MBC entry of the overlay ledger to increase the MBC balance of the MBC account of the online merchant by a corresponding amount;

broadcasting, by the at least one computing system, the remote exchange to a plurality of MBC verification nodes for verification;

identifying, by the at least one computing system using the overlay ledger, updated MBC balances for the customer and the online merchant decoupled from the total amount of MBC deposits and MBC credits of the institution and the first public and private key pair stored in the pooled account database; and executing, by the at least one computing system, one or more MBC operations based on the updated MBC balances reflected in the overlay ledger;

wherein the overlay ledger comprises a plurality of MBC entries corresponding with amounts of MBC stored separately from a plurality of private and public key pairs of the pooled account database, and wherein the MBC account of the online merchant is an MBC entry of the plurality of MBC entries in the overlay ledger.

2. The method of claim 1, wherein the remote, card-based exchange corresponds with both the MBC account and the fiat currency account, wherein associations of the amounts of MBC with each account are decoupled from the total amount of MBC deposits and MBC credits of the institution.

3. The method of claim 1, wherein a recipient computer system is associated with the online merchant remote from the customer computer system.

4. The method of claim 1, wherein receiving the remote exchange request further comprises receiving an exchange identifier that correlates to the MBC account, and wherein the amounts of MBC associated in the overlay ledger is less than a total amount of MBC on deposit at the institution.

5. The method of claim 1, wherein updating the overlay ledger is responsive to determining that the online merchant is registered with an institution computing system without validating the remote exchange with the plurality of MBC verification nodes.

6. The method of claim 1, wherein the remote exchange request is received in response to the customer manually inputting MBC account information corresponding to a checkout page of the online merchant.

7. The method of claim 1, wherein the MBC account corresponds with a limit, and wherein in response to determining the online merchant does not accept MBC payments, process the remote exchange request as a fiat currency payment using an open loop processing network.

8. The method of claim 1, wherein the remote exchange request comprises an indication of the institution of a plurality of financial institutions as a card issuer based on the online merchant determining the institution of the remote, card-based exchange.

9. A system comprising:

at least one processing circuit configured to:

receive, from a customer computer system, a remote exchange request for an amount, the remote exchange request corresponding with a math based currency (MBC) account of a customer and a fiat currency account of the customer, wherein the remote exchange request is initiated upon triggering a remote exchange for a remote, card-based exchange with an online merchant;

identify a first MBC entry in an overlay ledger that reflects an MBC balance of the MBC account of the customer and a second MBC entry in the overlay ledger that reflects an MBC balance for an MBC account of the online merchant;

generate or identify a first public and private key pair of the MBC account of the online merchant;

exchange, on a published blockchain, an amount of MBC equal to the amount using the first public and private key pair of the MBC account of the online merchant;

store the first public and private key pair of the MBC account of the online merchant in a pooled account database, wherein the pooled account database stores a total amount of MBC deposits and MBC credits of an institution;

update the first MBC entry of the overlay ledger to modify the MBC balance of the MBC account held by the customer by the amount of MBC and the second MBC entry of the overlay ledger to increase the MBC balance of the MBC account of the online merchant by a corresponding amount;

broadcast the remote exchange to a plurality of MBC verification nodes for verification;

identify, using the overlay ledger, updated MBC balances for the customer and the online merchant decoupled from the total amount of MBC deposits and MBC credits of the institution and the first public and private key pair stored in the pooled account database; and execute one or more MBC operations based on the updated MBC balances reflected in the overlay ledger;

wherein the overlay ledger comprises a plurality of MBC entries corresponding with amounts of MBC stored separately from a plurality of private and public key pairs of the pooled account database, and wherein the MBC account of the online merchant is an MBC entry of the plurality of MBC entries in the overlay ledger.

10. The system of claim 9, wherein the remote, card-based exchange corresponds with both the MBC account and the fiat currency account, wherein associations of the amounts of MBC with each account are decoupled from the total amount of MBC deposits and MBC credits of the institution.

11. The system of claim 9, wherein a recipient computer system is associated with the online merchant remote from the customer computer system.

12. The system of claim 9, wherein receiving the remote exchange request further comprises receiving an exchange identifier that correlates to the MBC account, and wherein the amounts of MBC associated in the overlay ledger is less than a total amount of MBC on deposit at the institution.

13. The system of claim 9, wherein updating the overlay ledger is responsive to determining that the online merchant is registered with an institution computing system without validating the remote exchange with the plurality of MBC verification nodes.

14. The system of claim 9, wherein the remote exchange request is received in response to the customer manually inputting MBC account information corresponding to a checkout page of the online merchant.

15. The system of claim 9, wherein the MBC account corresponds with a limit, and wherein in response to determining the online merchant does not accept MBC payments, process the remote exchange request as a fiat currency payment using an open loop processing network.

16. The system of claim 9, wherein the remote exchange request comprises an indication of the institution of a plurality of financial institutions as a card issuer based on the online merchant determining the institution of the remote, card-based exchange.

17. One or more non-transitory computer-readable storage media having instructions stored thereon that, when executed by at least one processing circuit, cause the at least one processing circuit to:
   receive, from a customer computer system, a remote exchange request for an amount, the remote exchange request corresponding with a math based currency (MBC) account of a customer and a fiat currency account of the customer, wherein the remote exchange request is initiated upon triggering a remote exchange for a remote, card-based exchange with an online merchant;
   identify a first MBC entry in an overlay ledger that reflects an MBC balance of the MBC account of the customer and a second MBC entry in the overlay ledger that reflects an MBC balance for an MBC account of the online merchant;
   generate or identify a first public and private key pair of the MBC account of the online merchant;
   exchange, on a published blockchain, an amount of MBC equal to the amount using the first public and private key pair of the MBC account of the online merchant;
   store the first public and private key pair of the MBC account of the online merchant in a pooled account database, wherein the pooled account database stores a total amount of MBC deposits and MBC credits of an institution;
   update the first MBC entry of the overlay ledger to modify the MBC balance of the MBC account held by the customer by the amount of MBC and the second MBC entry of the overlay ledger to increase the MBC balance of the MBC account of the online merchant by a corresponding amount;
   broadcast the remote exchange to a plurality of MBC verification nodes for verification;
   identify, using the overlay ledger, updated MBC balances for the customer and the online merchant decoupled from the total amount of MBC deposits and MBC credits of the institution and the first public and private key pair stored in the pooled account database; and
   execute one or more MBC operations based on the updated MBC balances reflected in the overlay ledger;
   wherein the overlay ledger comprises a plurality of MBC entries corresponding with amounts of MBC stored separately from a plurality of private and public key pairs of the pooled account database, and wherein the MBC account of the online merchant is an MBC entry of the plurality of MBC entries in the overlay ledger.

18. The one or more non-transitory computer-readable storage media of claim 17, wherein the remote, card-based exchange corresponds with both the MBC account and the fiat currency account, wherein associations of the amounts of MBC with each account are decoupled from the total amount of MBC deposits and MBC credits of the institution.

19. The one or more non-transitory computer-readable storage media of claim 17, wherein a recipient computer system is associated with the online merchant remote from the customer computer system.

20. The one or more non-transitory computer-readable storage media of claim 17, wherein the remote exchange request is received in response to the customer manually inputting MBC account information corresponding to a checkout page of the online merchant.

\* \* \* \* \*